US009232178B2

(12) United States Patent
Torgersrud et al.

(10) Patent No.: US 9,232,178 B2
(45) Date of Patent: Jan. 5, 2016

(54) TIME-BASED MULTIVARIABLE SECURE FACILITY ALARM SYSTEM

(71) Applicant: Telmate LLC

(72) Inventors: Richard Torgersrud, San Francisco, CA (US); Christopher Ditto, San Jose, CA (US); Grant Gongaware, San Francisco, CA (US)

(73) Assignee: Intelmate LLC, San Francisco, CA (US)

( * ) Notice: Subject to any disclaimer, the term of this patent is extended or adjusted under 35 U.S.C. 154(b) by 46 days.

(21) Appl. No.: 14/211,379

(22) Filed: Mar. 14, 2014

(65) Prior Publication Data

US 2014/0266686 A1    Sep. 18, 2014

Related U.S. Application Data

(60) Provisional application No. 61/801,119, filed on Mar. 15, 2013.

(51) Int. Cl.
| | |
|---|---|
| *G08B 19/00* | (2006.01) |
| *H04N 7/14* | (2006.01) |
| *G06Q 20/40* | (2012.01) |
| *H04M 15/00* | (2006.01) |

(52) U.S. Cl.
CPC ............... *H04N 7/141* (2013.01); *G06Q 20/40* (2013.01); *H04M 15/86* (2013.01)

(58) Field of Classification Search
CPC ........ G06F 21/32; G06Q 10/10; G06Q 50/01; G06Q 50/22; G06Q 20/40; H04L 12/66; H04N 7/141; H04M 15/86
USPC ......................................................... 340/521
See application file for complete search history.

(56) References Cited

U.S. PATENT DOCUMENTS

| | | | |
|---|---|---|---|
| 6,414,594 B1* | 7/2002 | Guerlain ........................ 340/506 |
| 6,553,336 B1* | 4/2003 | Johnson et al. ............... 702/188 |
| 6,665,380 B1* | 12/2003 | Cree et al. ................... 379/88.25 |
| 6,668,045 B1* | 12/2003 | Mow .......................... 379/88.19 |
| 7,256,816 B2* | 8/2007 | Profanchik et al. ......... 348/14.09 |
| 7,317,693 B1* | 1/2008 | Roesch et al. ................ 370/252 |
| 7,529,357 B1* | 5/2009 | Rae et al. ....................... 379/189 |
| 2002/0024443 A1* | 2/2002 | Hawkins et al. ........... 340/573.1 |
| 2009/0076832 A1* | 3/2009 | Collins ............................. 705/1 |
| 2010/0036269 A1* | 2/2010 | Ferren et al. .................. 600/504 |
| 2011/0047473 A1* | 2/2011 | Hanna et al. ................... 715/740 |
| 2011/0209192 A1* | 8/2011 | LeClerc Greer et al. ......... 726/1 |
| 2011/0317685 A1 | 12/2011 | Torgersrud et al. |
| 2012/0159519 A1* | 6/2012 | Matsuda ........................ 719/318 |
| 2012/0262271 A1 | 10/2012 | Torgersrud et al. |
| 2013/0268589 A1 | 10/2013 | Torgersrud et al. |
| 2013/0310726 A1* | 11/2013 | Miller et al. ................. 604/5.04 |
| 2014/0192132 A1* | 7/2014 | Avery et al. ................ 348/14.01 |
| 2014/0313275 A1* | 10/2014 | Gupta et al. ............... 348/14.06 |

* cited by examiner

*Primary Examiner* — Eric Blount
(74) *Attorney, Agent, or Firm* — Osha • Liang LLP

(57) ABSTRACT

An exemplary embodiment provides for a computer-implemented method that generates a time-based multivariable secure facility alarm. The method includes selecting a person for alert monitoring, alert monitor criteria pertaining to the person and alarm notification rules. When an occurrence that satisfies the alert monitor criteria are detected, an alarm notification, based upon the alarm notification rules, is generated. The method's alert monitor criteria include at least two events and a time period such that the alert monitor criteria is satisfied when the at least two events occur within the time period. Additionally, at least one event of the at least two events is a non-telephonic event.

27 Claims, 15 Drawing Sheets

TIME-BASED MULTIVARIABLE SECURE FACILITY ALARM SYSTEM

CROSS-REFERENCE TO RELATED APPLICATIONS

This application hereby claims the benefit of priority of U.S. Provisional Patent Application Ser. No. 61/801,119, filed on Mar. 15, 2013, entitled "Administrative Functions in a Controlled Facility," and is herein incorporated by reference.

BACKGROUND

Typically, automatically generated, security-related alarms, used in secure facilities and elsewhere, do not provide great value to investigators and security personnel as they are often based on one-off, somewhat generic occurrences that are not representative of situations that actually deserve attention. Also, they may occur frequently enough that they are perceived as annoyances to be ignored. Due to that, situations of interest may potentially be missed.

Additionally, automatically generated, security-related alarms may be triggered based on 'obvious' potentialities that are straightforward to detect but also easily avoided by more sophisticated, potential perpetrators.

Due to these deficiencies, and perhaps other ones, there is a need for improved security alarm systems.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An exemplary embodiment provides for a computer-implemented method that generates a time-based multivariable secure facility alarm. The method includes selecting a person for alert monitoring, alert monitor criteria pertaining to the person and alarm notification rules. When an occurrence that satisfies the alert monitor criteria are detected, an alarm notification, based upon the alarm notification rules, is generated. The method's alert monitor criteria include at least two events and a time period such that the alert monitor criteria is satisfied when the at least two events occur within the time period. Additionally, at least one event of the at least two events is a non-telephonic event.

One or more embodiments also provide for investigators to customize how they are notified of alarms. For example, the time of day an alarm occurs may be specified to send an alarm notification in a manner that differs if the same alarm occurs during another part of the day. One example may be a text message-delivered alarm notification if the alarm occurs during working hours and during all other hours an automated phone call would be utilized.

Various other aspects include an ability to set alarms based on, at least in part, interactions involving friends and families of detainees as well as financial transactions (for example, but not limited to, details such as the depositor, currency source (cash, credit card, etc), amount, number of transactions).

In addition to the exemplary aspects and embodiments described above, further aspects and embodiments will become apparent by reference to the drawings and by study of the following descriptions.

BRIEF DESCRIPTION OF DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
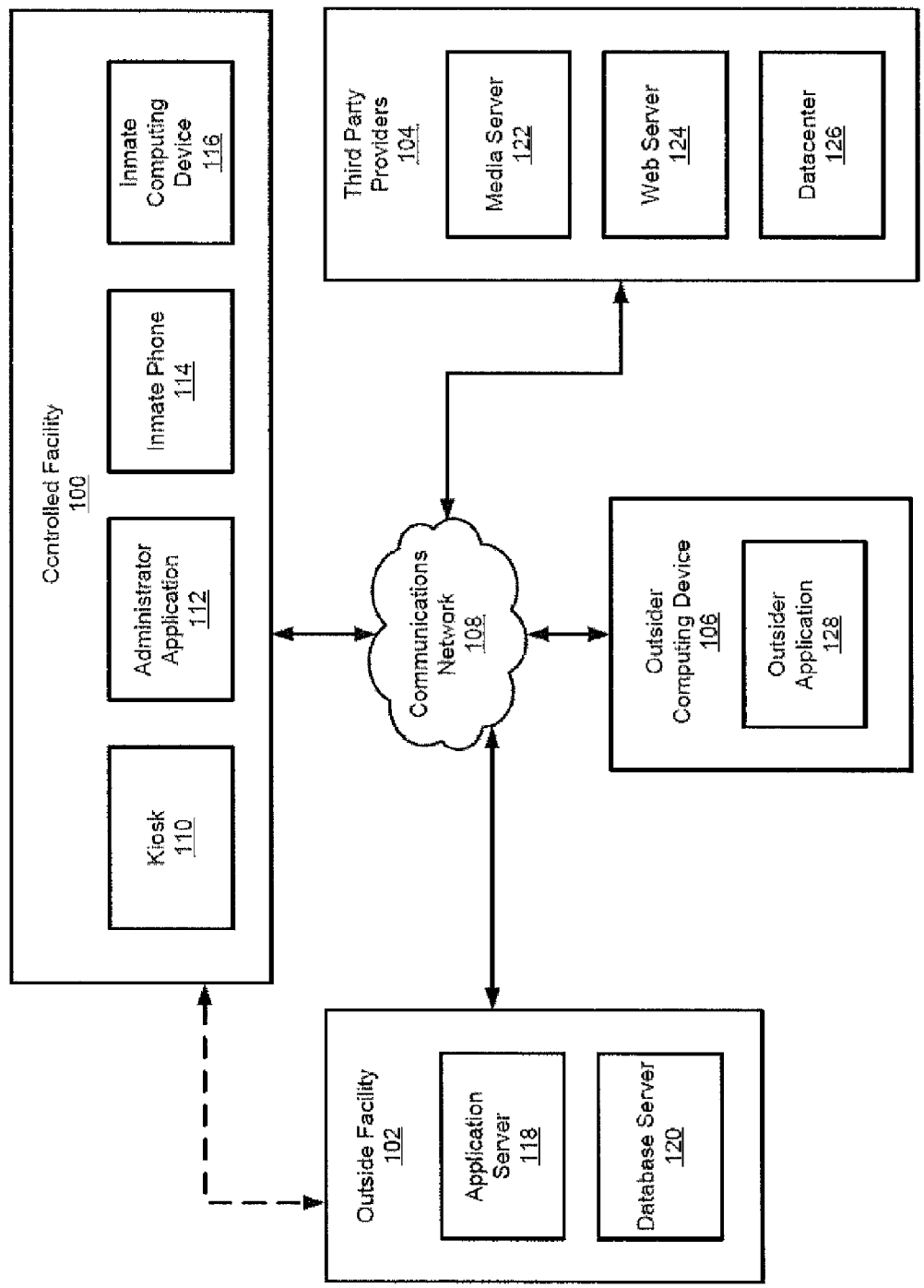
FIGS. 1-4, 5A, 5B, and 6 are schematic diagrams of an example secure facility call management system that may be used in conjunction with the claimed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The claimed embodiments provide for a time-based multivariable alarm system which may be utilized for creating alarms based on more than one event related to a person, such as a detainee. The claimed embodiments are time-based in that alarms are triggered when pre-defined events occur within a specified time period. For example, if two events are specified, an alarm may be configured to trigger when the second event occurs within four hours after the first event occurs. The system also provides for at least one event not being telephonic such as a financial transaction. The system further provides for configurable alarm notifications based on, in some implementations, alarm time-of-day occurrence is pre-configured to specify who will be notified and how the notification is delivered.

Exemplary methods for utilizing the claimed residence-based rating embodiments will be further described in a later section. Firstly, FIGS. 1-6 will now be presented and then followed by FIGS. 7-10 which illustrate pre-verification methods.

FIGS. 1-4, 5A, 5B, and 6 are schematic diagrams of an example secure facility call management system that may be used in conjunction with the claimed embodiments.

FIG. 1 shows a diagram of a system in accordance with at least one implementation of the claimed embodiments. As shown in FIG. 1, the system includes a controlled facility (100), an outside facility (102), third party providers (104), and an outsider computing device (106) each communicatively coupled to a communications network (108). The controlled facility (100) may include, but is not limited to, a kiosk (110), an administrator application (112), an inmate phone (114), and an inmate computing device (116). The outside facility (102) may include an application server (118) and a database server (120). The third party providers (104) may include a media server (122), a web server (124), and a datacenter (126). The outsider computing device (106) may include an outsider application (128).

In at least one implementation of the claimed embodiments, a controlled facility (100) is an access-restricted location. Examples of controlled facilities (e.g., controlled facility (100)) include, but are not limited to, detention environments (e.g., jails, prisons, etc.), immigration detention centers, military centers, government secure sites, law enforcement holding structures, secure business complexes, and psychiatric hospitals.

In at least one implementation of the claimed embodiments, an inmate is a person within a controlled facility (100) who is subject to one or more restrictions, primarily to his or her freedom or rights. Examples of inmates include, but are not limited to, prisoners, wards of the state, parolees, employees working in a secure business complex, temporary or long-term internees, patients, military personnel, uncharged suspects, and refugees. Inmate restrictions may be part of a court-imposed sentence on an inmate, while others may be specific to the controlled facility (100) in which the inmate resides. Restrictions may include limitations on an inmate's physical movement (i.e., physical restrictions) and limitations on the inmate's ability to communicate (i.e., communication restrictions). Communication restrictions include inmate use restrictions, inmate target restrictions, and device use restrictions.

In at least one implementation of the claimed embodiments, inmate use restrictions are limitations on an inmate's general ability to communicate with visitors and/or outsiders. Inmate use restrictions may include, for example, periods of time in which an inmate is not allowed to communicate with outsiders and/or visitors (e.g., between 10 PM and 8 AM, during an imposed one-week punitive period, etc.) and limitations based on lack of funds (e.g., insufficient commissary account balance to initiate a communication).

In at least one implementation of the claimed embodiments, inmate target restrictions are limitations on the target and/or source of a communication with the inmate. Inmate target restrictions may be specific outsiders and/or visitors with whom the inmate is not allowed to communicate (e.g., the victim of a crime perpetrated by the inmate, etc.). Inmate target restrictions may also include types of people with whom the inmate is not allowed contact (e.g., outsiders who are ex-cons, minors under the age of 18, etc.).

In at least one implementation of the claimed embodiments, device use restrictions are restrictions based on the condition and/or state of the communication device used by the inmate. Device use restrictions include, for example, limitations based on the location of the inmate's mobile device, limitations imposed based on a determination that the device has been tampered with, etc.

In at least one implementation of the claimed embodiments, an outsider is a person outside the controlled facility (100) who may be the source and/or target of a communication with an inmate. In at least one implementation of the claimed embodiments, outside the controlled facility (100) means external to the physical perimeter of the controlled facility (100). An outsider who enters the controlled facility (100) for the purpose of communicating with an inmate is referred to as a visitor.

In at least one implementation of the claimed embodiments, the kiosk (110) is a computing system with functionality to facilitate communication between an inmate and a visitor and/or outsider. Such communication facilitation may include creating a system identity data item and/or secure social networking account, adding and/or importing contact information for outsiders with whom the inmate wishes to communicate, uploading media (e.g., photos, videos, audio, and text) to, and/or viewing media from, a secure social network, sending and/or receiving messages and/or other media, acting as an endpoint for voice and video communication between an inmate and a visitor and/or outsider, scheduling a communication, and managing a commissary and/or communications account. Further detail about kiosks (e.g., kiosk (110)) is provided in FIG. 2, FIG. 5A, FIG. 5B, and FIG. 6. Kiosks may also, in some implementations, be deployed outside of controlled facility (100).

In at least one implementation of the claimed embodiments, the administrator application (112) is a process or group of processes executing on a computing system with functionality to enable an administrator to create, remove, and/or enforce one or more restrictions on an inmate. In at least one implementation of the claimed embodiments, an administrator is a person associated with the controlled facility charged with enforcing one or more restrictions. Examples of administrators include, but are not limited to, prison guards, orderlies, wardens, prison staff, jailers, information technology technicians, system administrators, and law enforcement agents. Using the administrator application, an administrator may retrieve and/or alter the identity data item and/or secure social network account of an inmate, visitor, and/or outsider. Further detail about the administrator application (112) is provided in FIG. 2.

In at least one implementation of the claimed embodiments, the inmate phone (114) is a device with functionality to send and receive audio communications between an inmate and an outsider and/or visitor. In at least one implementation of the claimed embodiments, the inmate phone (114) is a stationary (i.e., non-mobile) device. Further, a single inmate phone (114) may be used by more than one inmate. Further detail about the inmate phone (114) is provided in FIG. 2.

In at least one implementation of the claimed embodiments, the inmate computing device (116) is a computing device with functionality to enable an inmate to communicate with a visitor and/or outsider. Specifically, the inmate computing device (116) may be used to send and/or receive text messages and/or initiate and/or receive calls (e.g., voice and/or video). In at least one implementation of the claimed embodiments, the inmate computing device (116) also enables an inmate to access a secure social network. Specifically, the inmate computing device (116) may be used to upload media to, and/or view media from, a secure social network account of the inmate and/or another secure social network member. In at least one implementation of the claimed embodiments, the inmate computing device (116) is a mobile computing device (e.g., a smartphone, a laptop, a tablet, etc.). Further detail about the inmate computing device (116) is provided in FIG. 2 and FIG. 6.

In at least one implementation of the claimed embodiments, the elements within the controlled facility (100) are communicatively coupled to the communications network (108). In at least one implementation of the claimed embodiments, the communications network (108) is a collection of computing systems and other hardware interconnected by communication channels. The communications network (108) may include networks that are exclusively and/or primarily used for a single type of communication, such as a telephone network (e.g., Plain Old Telephone System (POTS)), and/or networks used for a wide array of communication types, such as the Internet through Voice over IP (VOIP). Communication channels used by the communications network (108) may include, for example, telephone lines, networking cables, wireless signals, radio waves, etc. Fees charged and payments received by the provider(s) of the communications network (108) may involve multiple parties, including a service provider of the outside facility (102), the management of the controlled facility (100), and provider(s) of the communications network (108). In at least one implementation of the claimed embodiments, fees may be split between multiple parties based on the terms of underlying agreements and/or contracts between the parties. Further, rebates, reimbursements, and/or refunds may be afforded to and paid to the management of the controlled facility (100) based on the terms of underlying agreements and/or contracts between the parties. For example, the management of the controlled facility (100) may receive a rebate from the service provider of the services provided to inmates based on such factors as the volume of use, the dollar amount, and/or the frequency of use.

In at least one implementation of the claimed embodiments, the outside facility (102) is a group of computing systems located outside of the controlled facility (100). Specifically, the outside facility (102) may house system elements with functionality to facilitate communication between inmates and outsiders, access communication data between inmates and outsiders, and enforce one or more restrictions imposed on inmates and inmate communications. In at least one implementation of the claimed embodiments, the outside facility (102) is connected directly to the controlled facility (100) bypassing a generally accessible communications network (communications network (108)). One or more of the components within the outside facility (102) may alternatively be located within the controlled facility (100) and/or within the third party providers (104).

In at least one implementation of the claimed embodiments, the application server (118) is a computing system with functionality to authenticate an inmate, outsider, administrator, reviewer, and/or investigator for access to system functionality (e.g., initiating voice and/or video calls, sending text messages, etc.) and/or data stored on the database server (120) (e.g., inmate identities, communications between inmates and outsiders, etc.). The application server may authenticate inmates, outsiders, administrators, reviewers, and/or investigators using passwords, biometric data, digital access codes, and/or physical access devices. Further detail about the application server (118) is provided in FIG. 3.

In at least one implementation of the claimed embodiments, the database server (120) is a computing system with functionality to store identities used to authenticate inmates, outsiders, administrators, reviewers, and/or investigators. Such identities may include verified data used to compare to verification data provided by the inmate, outsider, administrator, reviewer, and/or investigator to authenticate the inmate, outsider, administrator, reviewer, and/or investigator.

In at least one implementation of the claimed embodiments, the database server (120) also stores communication data about communications between an inmate and an outsider and/or visitor. Such communication data may include, for example, a recording of a video call, the length of a voice call, the frequency of video calls, sent and received text messages, etc. The database server (120) may also store media submitted to a secure social network before, during, and/or after the media has been reviewed. Further detail about the database server (120) is provided in FIG. 3.

In at least one implementation of the claimed embodiments, the third party providers (104) are computing systems that provide network application and data storage services (i.e., cloud computing services). Third party providers (104) may include service providers used directly by inmates and outsiders, such as photo sharing services, general social networking sites, and digital music retailers. Third party providers (104) may include service providers employed by administrators and for use by inmates and outsiders, such as audio and video streaming applications, conferencing applications, and secure social network media storage. One or more of the components within the third party providers (104) may alternatively be located within the controlled facility (100) and/or the outside facility (102).

In at least one implementation of the claimed embodiments, the media server (122) is a computing system or group of computing system with functionality to provide network application services to facilitate communication between an inmate and an outsider, and to facilitate access to a secure social network. Such services include, but are not limited to, VoIP services, video conferencing services, and media streaming services.

In at least one implementation of the claimed embodiments, the web server (124) is a computing system or group of computing system with functionality to provide an interface to access and interact with webpages and other network application services. In at least one implementation of the claimed embodiments, the web server (124) is a type of media server (122).

In at least one implementation of the claimed embodiments, the datacenter (126) is a computing system or group of computing system with functionality to provide an interface to access and interact with data stored on one or more data servers (not shown). In at least one implementation of the claimed embodiments, the datacenter (126) is a type of media server (122).

In at least one implementation of the claimed embodiments, the outsider computing device (106) is a computing device with functionality to execute the outsider application (128). In at least one implementation of the claimed embodiments, the outsider computing device (106) is a mobile computing device (e.g., a smartphone, a laptop, a tablet, etc.). Further detail about the outsider computing device (106) is provided in FIG. 6.

In at least one implementation of the claimed embodiments, the outsider application (128) is a process or group of processes (in software, firmware, hardware, or combination thereof) with functionality to enable communication between an outsider and an inmate. Specifically, the outsider application (128) may be used to send and/or receive text messages and/or initiate and/or receive calls (e.g., voice and/or video). In at least one implementation of the claimed embodiments, the outsider application (128) also enables an outsider to access a secure social network. Specifically, the outsider application (128) may be used to upload media to, and/or view media from, a secure social network account of the outsider, an inmate, and other secure social network member.

Figure 2:
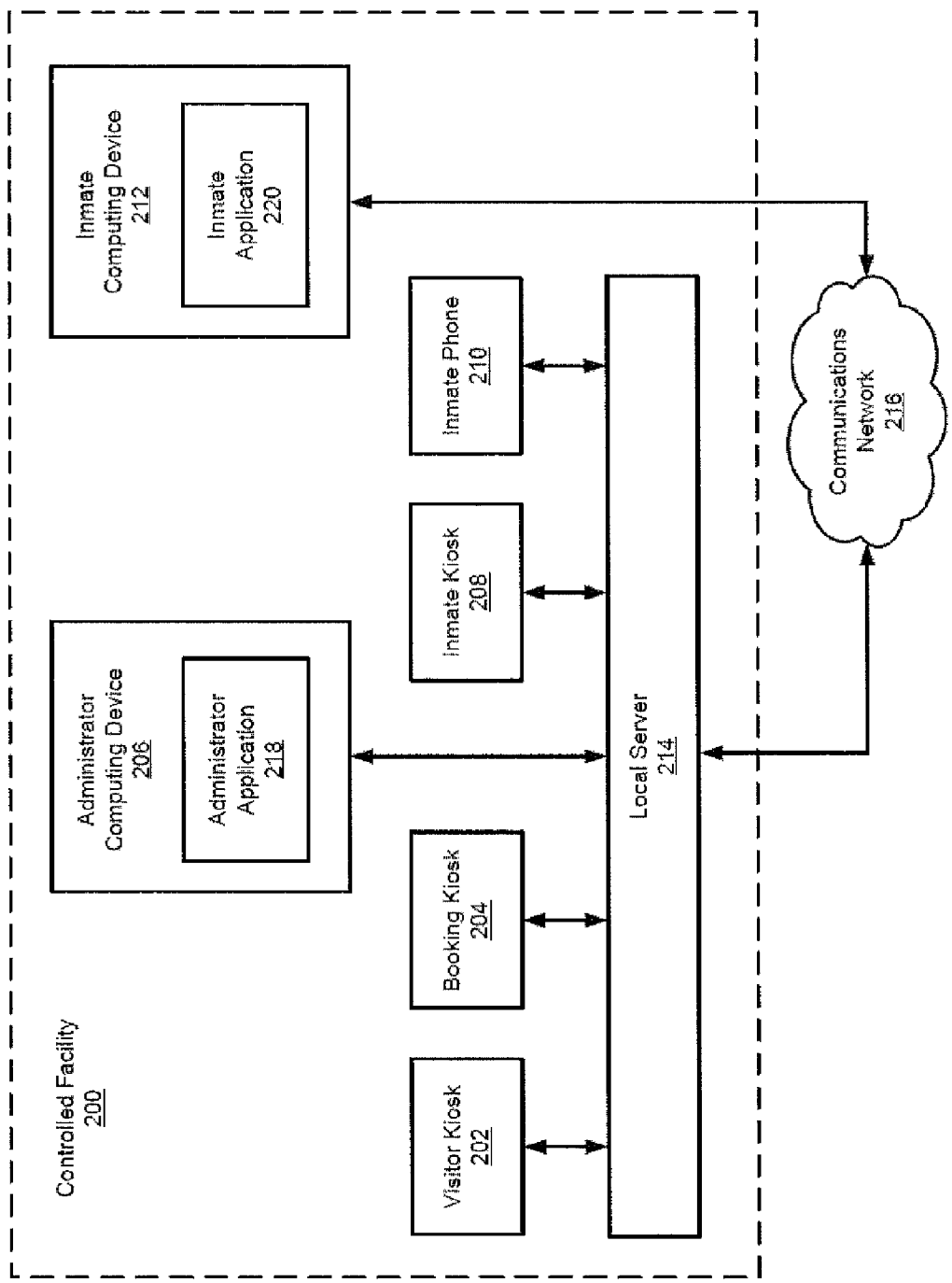

FIG. 2 shows a controlled facility in accordance with at least one implementation of the claimed embodiments. As shown in FIG. 2, the controlled facility (200) may include a visitor kiosk (202), a booking kiosk (204), an administrator computing device (206), an inmate kiosk (208), an inmate phone (210), an inmate computing device (212), and a local server (214). The inmate computing device (212) and the local server (214) are communicatively coupled to the communications network (216). The administrator computing device (206) includes an administrator application (218). The inmate computing device (212) includes an inmate application (220).

In at least one implementation of the claimed embodiments, the visitor kiosk (202) is a computing system with functionality to facilitate communication between an inmate and a visitor. Specifically, the visitor kiosk (202) may be a combination of computing hardware and software used by a visitor to make and receive voice and video calls to/from an inmate residing in the same controlled facility (200) and/or another controlled facility (not shown). The visitor kiosk (202) may also be used to schedule a voice and/or video call with an inmate for a future date. Further, the visitor kiosk (202) may also include the functionality to exchange media (e.g., photos, videos, and audio) with an inmate residing in the controlled facility (200). The visitor kiosk (202) may include functionality to generate such media, such as a camera, microphone, keyboard, and software to record and/or otherwise create media to send to an inmate. Such media may be subject to review before being delivered.

In at least one implementation of the claimed embodiments, a visitor wanting to use a visitor kiosk (202) may be required to participate in an authentication process to verify the identity of the visitor. The authentication process may include creating an identity data item and verified data for storage and later comparison. The verified data used for authentication may be a username and password combination and/or biometric information about the visitor.

In at least one implementation of the claimed embodiments, the visitor kiosk (202) includes functionality to access a secure social network. Specifically, the visitor kiosk (202) may be used by a visitor to create and manage a secure social network account. The visitor kiosk (202) may also be used by a visitor to upload digital media to the visitor's secure social network account and/or the account of another secure social network member. The visitor kiosk (202) may further be used to view digital media uploaded to the visitor's social network account and/or the account of another secure social network member.

In at least one implementation of the claimed embodiments, the visitor kiosk (202) includes functionality to manage a commissary account for one or more inmates. Specifically, a visitor may use a visitor kiosk (202) to add money to the commissary account of an inmate in the controlled facility (200), view a transaction history of the commissary account, transfer funds between commissary accounts, and/or remove funds from a commissary account. Further detail about the visitor kiosk (202) is provided in FIG. 5A and FIG. 5B.

In at least one implementation of the claimed embodiments, the booking kiosk (204) is a computing system with functionality to aid administrators in admitting an inmate into a controlled facility (e.g., controlled facility (200)). Specifically, the booking kiosk (204) may include functionality to create and/or update an inmate identity data item. Specifically, the booking kiosk (204) may be used to obtain verified data (e.g., passwords, biometric data, etc.) and save the verification data in one or more identity data items for the inmate. The verified data may then be used to authenticate the inmate (e.g., to access the communications network (216), etc.). In at least one implementation of the claimed embodiments, the booking kiosk may also be used to associate one or more restrictions with the inmate via the inmate's identity data item.

In at least one implementation of the claimed embodiments, the booking kiosk (204) includes functionality to input contact information for visitors, outsiders, administrators, and/or other inmates with whom the inmate wants to communicate. Such contact information may then be associated with the inmate's identity data item, and may be used to initiate a voice and/or video call, or otherwise transmit media to visitors, outsiders, and/or other inmates. Further, in at least one implementation of the claimed embodiments, the contact information may be retrieved from an inmate's mobile computing device (e.g., cell phone, smart phone, etc.) and/or a local or remote data storage device (e.g., a flash drive, a webmail account, etc.). The contact information may be retrieved using a wired and/or wireless connection between the booking kiosk and the inmate's mobile computing device and/or the data storage device. The contact information may be subject to review before the inmate is permitted to contact the visitor, outsider, administrator, and/or other inmate.

In at least one implementation of the claimed embodiments, the booking kiosk (204) includes functionality to prepare a mobile computing device for use by the inmate within the controlled facility (200). Specifically, a controlled facility (200) may allow inmates the use of computing devices while in and/or subject to the controlled facility (200). However, use of such inmate computing devices may require that the computing device is provisioned with software restricting the use of the inmate computing device. The booking kiosk (204) may be used to provision the inmate computing device as required. Further detail about the booking kiosk (204) is provided in FIG. 5A and FIG. 5B.

In at least one implementation of the claimed embodiments, the administrator computing device (206) is a computing system or group of computing systems with functionality to execute the administrator application (218). In at least one implementation of the claimed embodiments, the administrator application (218) is a process or group of process with functionality to provide access to communications between inmates at the controlled facility (200) and visitors, outsiders, administrator, and other inmates. The administrator application (218) may also be used to monitor current voice and/or video calls between an inmate and a visitor, outsider, administrator, and/or other inmate.

In at least one implementation of the claimed embodiments, the administrator application (218) is used to manage an identity data item associated with an inmate. Such management may include altering the restrictions (device use restrictions, inmate use restrictions, and inmate target restrictions) applicable to the inmate. In at least one implementation of the claimed embodiments, the administrator application (218) is used to access the secure social network account of an inmate, visitor, and/or outsider. In at least one implementation of the claimed embodiments, the administrator application (218) may provide heightened access (i.e., a level of access greater than that of the inmate, visitor, and/or outsider) to data stored in the secure social networking account.

In at least one implementation of the claimed embodiments, the inmate kiosk (208) is a computing system with functionality to facilitate communication between an inmate and a visitor and/or outsider. Specifically, the inmate kiosk (208) may be a combination of computing hardware and software used by an inmate to make and receive voice and video calls to/from a visitor, outsider, and/or another inmate residing in another controlled facility (not shown). The inmate kiosk (208) may also be used to schedule a voice and/or video call with a visitor at a future date. Initiating and/or scheduling a voice and/or video call may include determining whether the currently attempted call, and/or the scheduled call, is adverse to one or more restrictions (e.g., inmate use restrictions, device use restrictions, and/or inmate target restrictions). Further, the inmate kiosk (208) may also include the functionality to exchange media (e.g., photos, videos, and audio) with a visitor and/or outsider. The inmate kiosk (208) may include functionality to generate such media, such as a camera, microphone, keyboard, and software to record and/or otherwise create media to send to a visitor and/or outsider. Such media may be subject to review before being delivered.

In at least one implementation of the claimed embodiments, an inmate wanting to use an inmate kiosk (208) may be required to participate in an authentication process to verify the identity of the inmate. The authentication process may include providing verification data for comparison to verified data previously obtained from the inmate and stored in the inmate identity data item. The verified data may be a username and password combination and/or biometric information about the inmate.

In at least one implementation of the claimed embodiments, the inmate kiosk (208) includes functionality to access a secure social network. Specifically, the inmate kiosk (208) may be used by an inmate to manage a secure social network account. The inmate kiosk (208) may include functionality to generate such media, such as a camera, microphone, keyboard, and software to record and/or otherwise create media to send to a visitor and/or outsider. The inmate kiosk (208) may also be used by an inmate to upload digital media to the inmate's secure social network account and/or the account of another secure social network member. The inmate kiosk (208) may further be used to view digital media uploaded to the inmate's social network account and/or the account of another secure social network member. Uploaded media may be subject to review before posting.

In at least one implementation of the claimed embodiments, the inmate kiosk (208) includes functionality to manage a commissary account for the inmate. Specifically, an inmate may use an inmate kiosk (208) to view a transaction history of the commissary account and/or to apply commissary funds for goods and services consumed and/or enjoyed by the inmate. Further detail about the inmate kiosk (208) is provided in FIG. 5A and FIG. 5B.

In at least one implementation of the claimed embodiments, the inmate phone (210) is a device with functionality to send and receive audio communications between an inmate and an outsider and/or visitor. The inmate phone (210) may be implemented as handset connected to a telephone line. In at least one implementation of the claimed embodiments, all or part of the voice call may be conducted over a VoIP connection. In at least one implementation of the claimed embodiments, a single inmate phone (210) is utilized by multiple inmates.

In at least one implementation of the claimed embodiments, initiating and/or receiving a voice call using the inmate phone (210) requires a form of authentication (e.g., providing a password, personal identification number, and/or voice verification). In at least one implementation of the claimed embodiments, voice calls made using the inmate phone (210) are monitored by one or more administrators using the administrator computing device (206), and are recorded and stored in a data storage system within the controlled facility (200), within the outside facility (not shown), and/or within a third party provider (not shown). The inmate phone (210) may also be subject to device use restrictions limiting the ability to use the inmate phone (210) at certain times (e.g., between 9 PM and 8 AM) and/or under certain conditions (e.g., emergency lockdown).

In at least one implementation of the claimed embodiments, the identity of the visitor and/or outsider targeted by the inmate and/or attempting to contact the inmate using the inmate phone (210) is verified against inmate target restrictions imposed on the inmate. Such restrictions may be associated with the inmate's identity data item and may be stored locally within the controlled facility (200), within the outside facility (not shown), and/or within a third party provider (not shown). The visitor and/or outsider identity may be verified by the local server (214) or by another server within the outside facility (not shown), or within a third party provider (not shown).

In at least one implementation of the claimed embodiments, the inmate computing device (212) is a computing system configured to execute the inmate application (202). In at least one implementation of the claimed embodiments, each inmate computing device (212) is utilized exclusively by a single inmate. In at least one implementation of the claimed embodiments, access to the inmate application requires a form of initial authentication. This initial authentication may use verification data stored locally on the inmate computing device (212) (e.g., a code and/or combination used to unlock the phone, locally stored biometric data, etc.).

In at least one implementation of the claimed embodiments, accessing a communications network (e.g., communications network (216)) using the inmate application (220) may require further network-based authentication. This further authentication may use verification data stored external to the inmate computing device (212) but locally within the controlled facility (200), and/or remotely within the outside facility (not shown) and/or within a third party provider (not shown).

In at least one implementation of the claimed embodiments, an authenticated inmate may use the inmate application to initiate and/or receive calls (e.g., voice and/or video), initiate and/or receive messages (e.g., text and/or media), schedule a voice and/or video call, manage a commissary account, and/or post media to a secure social network. In at least one implementation of the claimed embodiments, voice and video calls made using the inmate computing device (212) are monitored by one or more administrators using the administrator computing device (206), and are recorded and stored in a data storage system within the controlled facility (200), within the outside facility (not shown), and/or within a third party provider (not shown).

In at least one implementation of the claimed embodiments, the identity of the visitor and/or outsider targeted by the inmate and/or attempting to contact the inmate using the inmate computing device (212) is verified against inmate target restrictions imposed on the inmate. Such restrictions may be associated with the inmate's identity data item and may be stored locally within the controlled facility (200), within the outside facility (not shown), and/or within a third party provider (not shown). The visitor and/or outsider identity may be verified by the local server (214) and/or by another server within the outside facility (not shown), and/or within a third party provider (not shown).

In at least one implementation of the claimed embodiments, the inmate computing system (212) and/or the inmate application (220) may limit access to the communications network (216) based on one or more restrictions (inmate use restrictions, inmate target restrictions, and device use restrictions). Further, the inmate computing system (212) and/or the inmate application (220) may gather data from input devices of the inmate computing system (212) to determine whether one or more restrictions apply. Such input devices may include, for example, a system clock, a global positioning system antenna, a wide area network antenna, etc.

In at least one implementation of the claimed embodiments, the local server (214) is a computer system or group of computers systems located within the controlled facility (200) that facility communication between inmates and visitors, outsiders, and/or other inmates. Specifically, the local server (214) may implement the software necessary to host voice and video calls between and among the visitor kiosk (202), the inmate kiosk (208), the inmate phone (210), and an outsider computing system (not shown). The local server (214) may also include functionality to enforce communication restrictions associated with the inmates using the inmate kiosk (208) and/or inmate phone (210). Alternatively, the local server (214) may merely provide access to other systems capable of hosting the communication software and data storage (e.g., located within an offsite facility and/or a third party provider). Further, in at least one implementation of the claimed embodiments, the local server (214) includes functionality to regulate inmate access to a secure social network.

Figure 3:
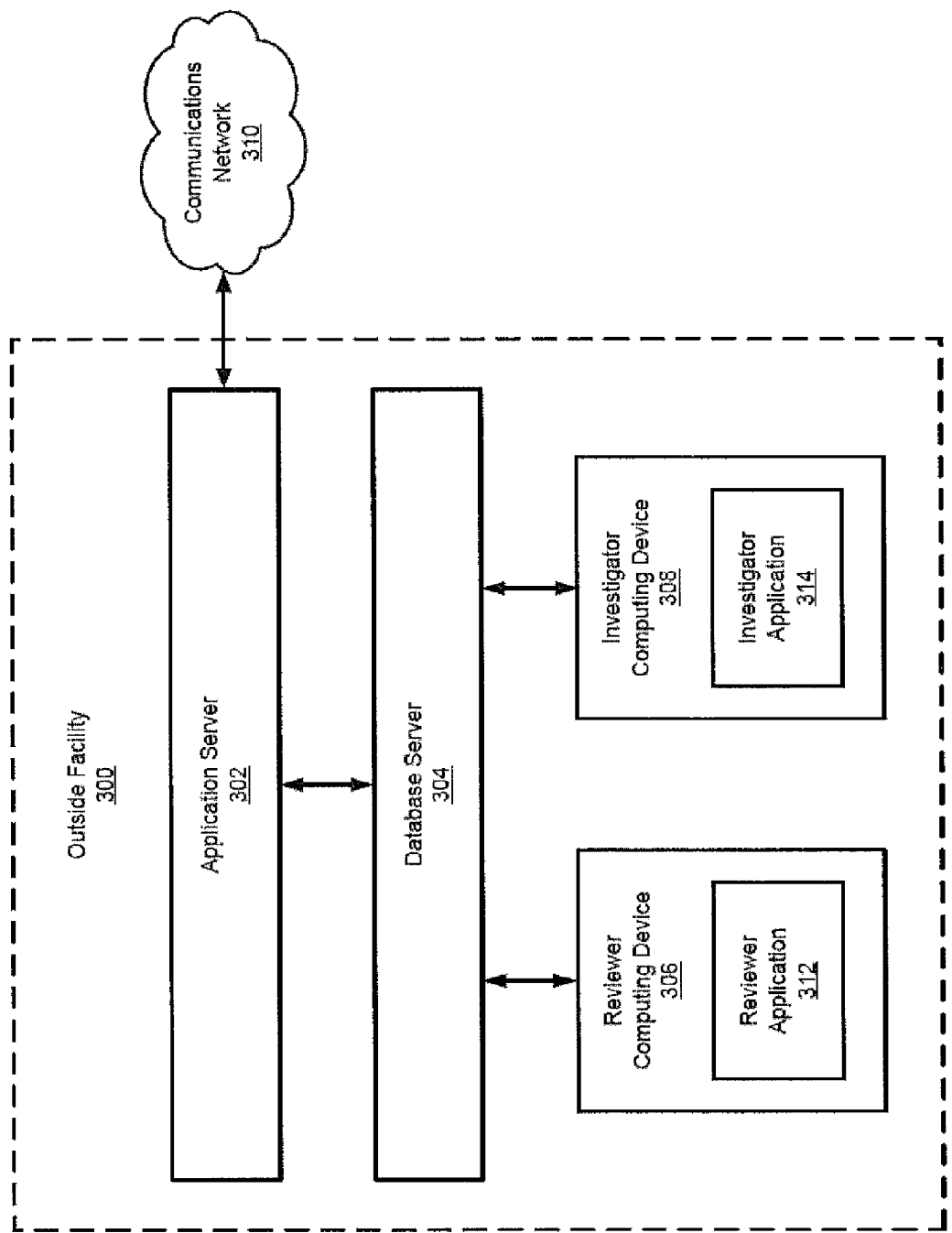

FIG. 3 shows an outside facility in accordance with at least one implementation of the claimed embodiments. As shown in FIG. 3, the outside facility (300) may include an application server (302), a database server (304), a reviewer computing system (306), and an investigator computing system (308). The application server (302) is communicatively coupled to the communications network (310). The reviewer computing device (306) may include a reviewer application (312), and the investigator computing device (308) may include an investigator application (314).

In at least one implementation of the claimed embodiments, the application server (302) is a computing system or group of computing systems configured to authenticate inmates, visitors, outsiders, administrators, reviewers, and/or investigators. Specifically, the application server (302) includes functionality to receive a request to authenticate an inmate, visitor, outsider, administrator, reviewer, and/or an investigator, retrieve verified data associated with the request, and compare the verified data to verification data submitted in the authentication request. In at least one implementation of the claimed embodiments, the application server provides access to identity data items and other data stored in the database server (304).

In at least one implementation of the claimed embodiments, the database server (304) is a computing system or group of computing systems configured to store data about inmates, visitors, outsiders, administrators, reviewers, and/or investigators as well as communication data describing communications between and among inmates, visitors, outsiders, administrators, reviewers, and/or investigators. Data stored in the database server may include, but is not limited to, identity data items, verified data, approved communication media, communication media pending review In at least one implementation of the claimed embodiments, the reviewer computing device (306) is a computing system configured to execute the reviewer application (312). In at least one implementation of the claimed embodiments, a reviewer is a person charged with viewing a media item submitted by an inmate, visitor, outsider and/or administrator, and determining one or more attributes of the media item. Based on the determined attributes of the media item, the reviewer may then approve the media item for transmission to its target inmate, visitor, and/or outsider. Alternatively, the reviewer may reject the media item, conditionally approve the media item, and/or redact parts of the media item, thus preventing complete transmission to its target inmate, visitor, and/or outsider. In at least one implementation of the claimed embodiments, the reviewer application (312) include functionality to view media items, associate one or more attributes to the media item, and/or mark the media items as approved and/or rejected.

In at least one implementation of the claimed embodiments, the investigator computing device (308) is a computing system configured to execute the investigator application (314). In at least one implementation of the claimed embodiments, an investigator is a person gathering information about an inmate, visitor, and/or outsider generally for the purposes of law enforcement. The investigator application (314) includes functionality to provide access to data stored on the database server (304) for investigative purposes.

Figure 4:
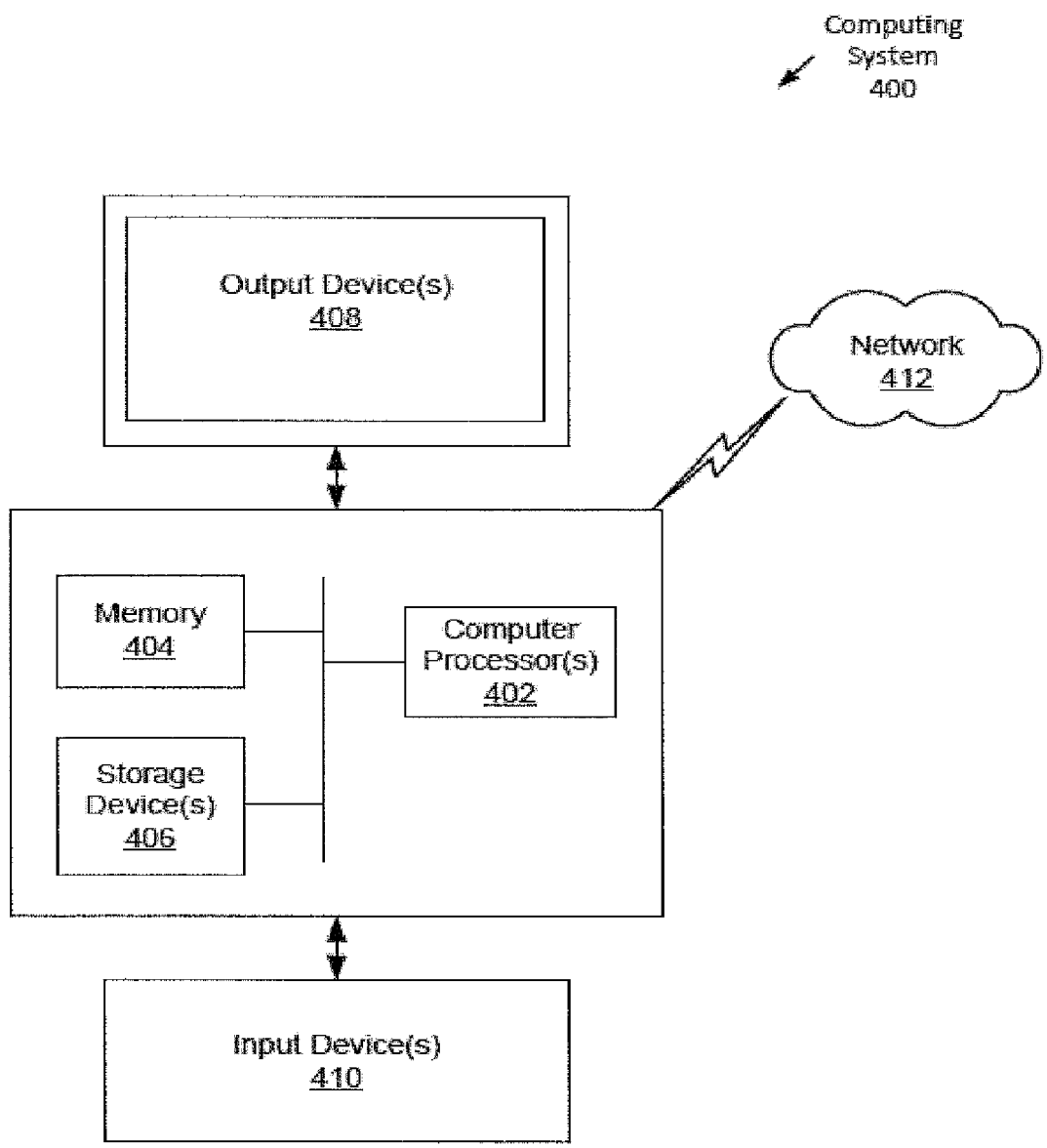

FIG. 4 shows a computing system in accordance with at least one implementation of the claimed embodiments. One or more of the computing devices, kiosks, and computing components disclosed in the present application may be implemented by or as part of the computing system shown in FIG. 4. As shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In at least one implementation of the claimed embodiments, the node corresponds to a distinct computing device. Alternatively, the node may correspond to a computer processor with associated physical memory. The node may alternatively correspond to a computer processor or micro-core of a computer processor with shared memory and/or resources.

Figure 5A:
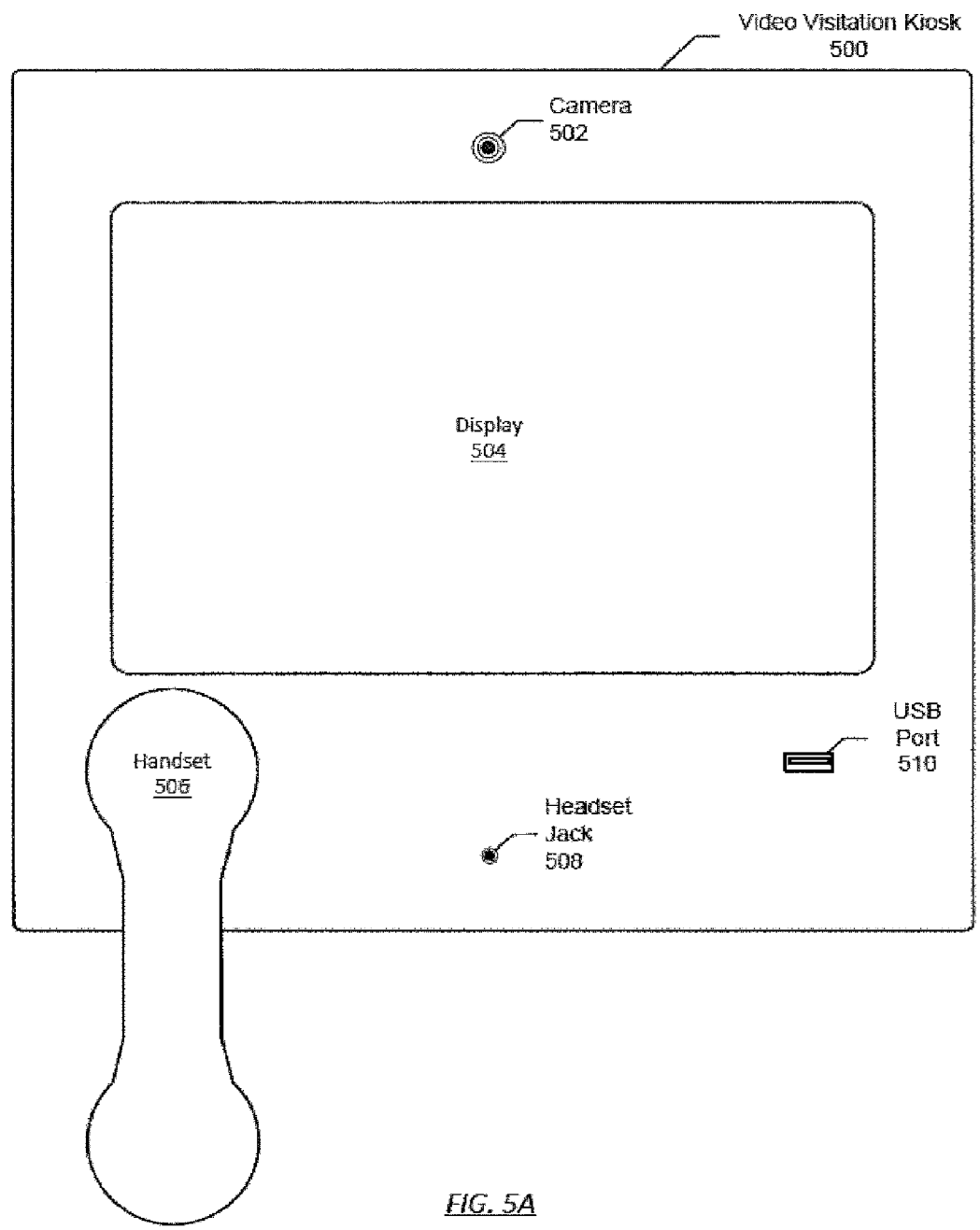

FIG. 5A shows a video visitation kiosk in accordance with at least one implementation of the claimed embodiments. Specifically, the video visitation kiosk (500) is a type of computing device as described in FIG. 4. As shown in FIG. 5A, the video visitation kiosk (500) includes a camera (502), a display (504), a handset (506), a headset jack (508), and a universal serial bus (USB) port (510).

Figure 5B:
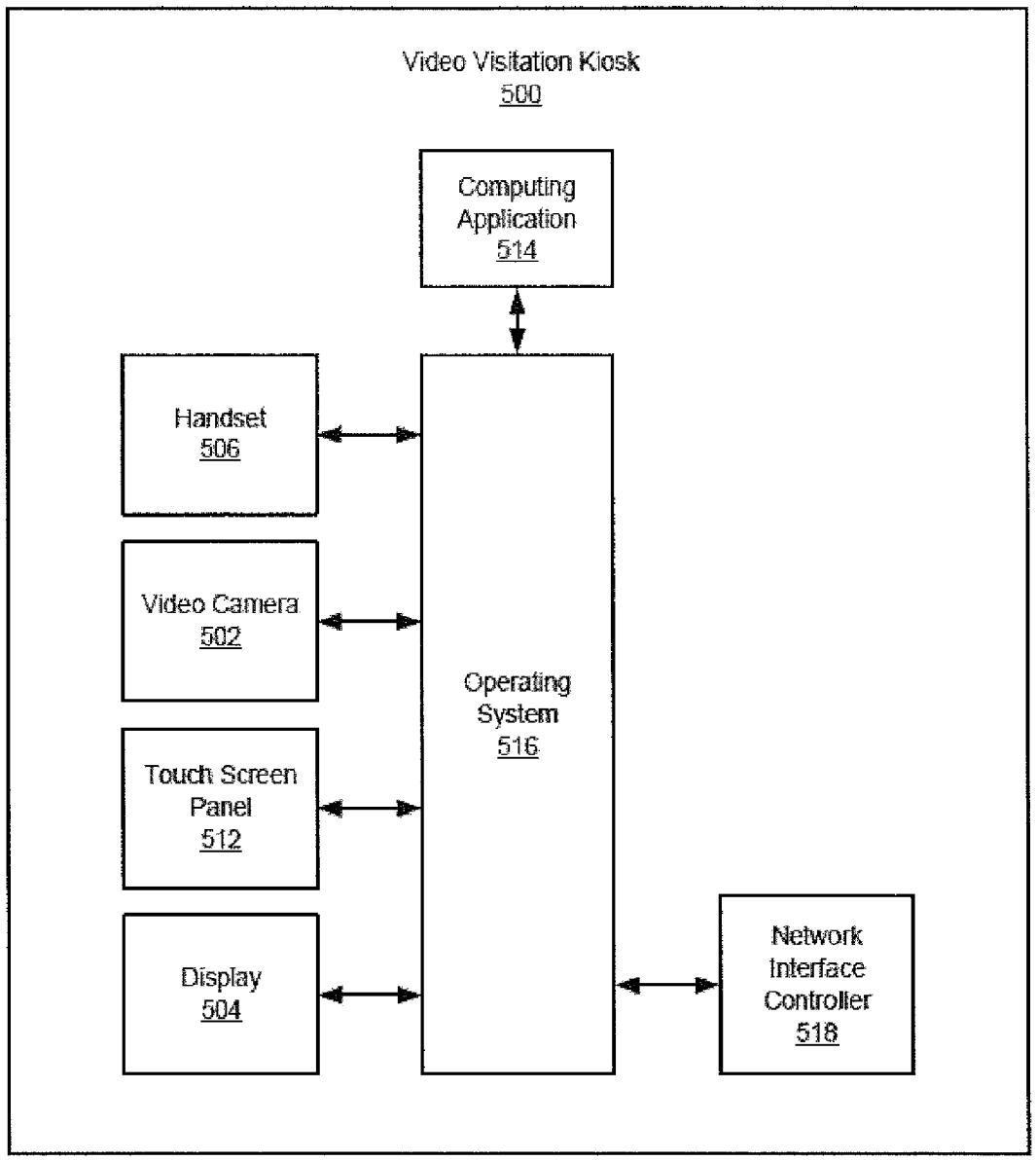

FIG. 5B shows the hardware and software elements of a video visitation kiosk in accordance with at least one implementation of the claimed embodiments. The hardware and software elements shown in FIG. 5B may be in addition to the elements described in FIG. 4. As shown in FIG. 5B, the video visitation kiosk (500) includes a handset (506), a video camera (502), a touch screen panel (512), a display (504), a computing application (514), an operating system (516), and a network interface controller (518).

Figure 6:
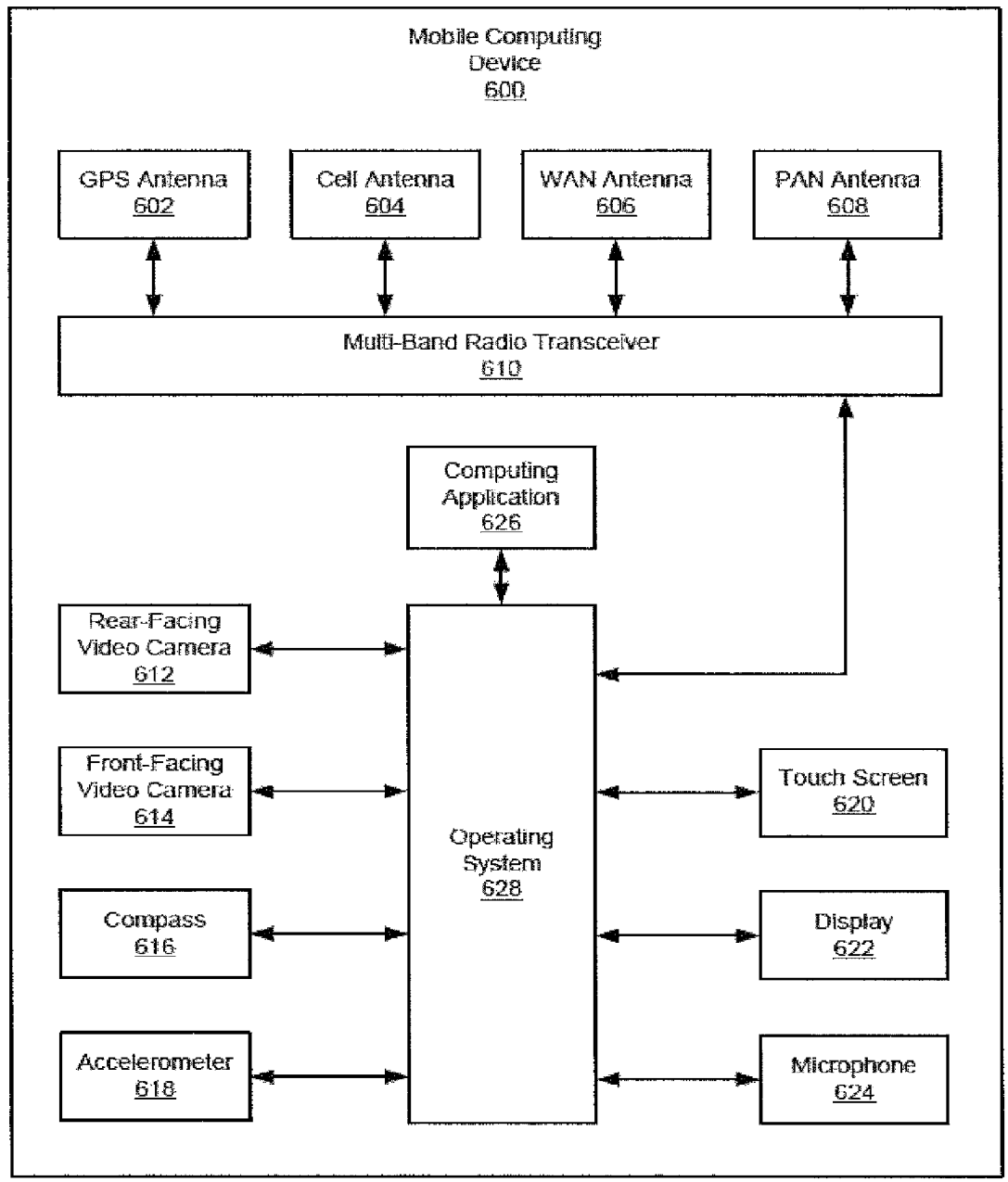

FIG. 6 shows the hardware and software elements of a mobile computing device in accordance with at least one implementation of the claimed embodiments. Specifically, the mobile computing device (600) is a type of computing device as described in FIG. 4. The hardware and software elements shown in FIG. 6 may be in addition to the elements described in FIG. 4.

As shown in FIG. 6, the mobile computing device (600) may include a global positioning system (GPS) antenna (602), a cell antenna (604), a wide area network (WAN) antenna (606), and a personal area network (PAN) antenna (608), each connected to a multi-band radio transceiver (610). The mobile computing device (600) also may include a rear-facing video camera (612), a front-facing video camera (614), a compass (616), an accelerometer (618), a touch screen (620), a display (622), and a microphone (624). The mobile computing device (600) also may include a computing application (626) executing on an operating system (628).

This disclosure also relates to methods and systems used in a detention environment for verifying an individual's identity utilizing a centralized database operable across disparate types of interactions. Current methods and systems for identity verification in detention environments are non-uniform for disparate types of interactions and the methods and systems are not easily compatible with one another. Therefore, it is difficult to track interactions of an individual and an individual subject to the detention environment. The disclosed method and system verify all individuals contacting, interacting with or otherwise connecting to an individual subject to the detention environment in one or more embodiments of the invention. In contrast, those individuals subject to the detention environment, such as inmates, patients, and/or detainees, may be verified using existing methods and systems since it is possible to obtain a wide range of information from the individual when they are in the detention environment. For example, when a prisoner is processed through a jail, it is common for the jail to obtain the prisoner's identity information such e.g., as fingerprints, DNA samples, and voice samples.

Figure 7:
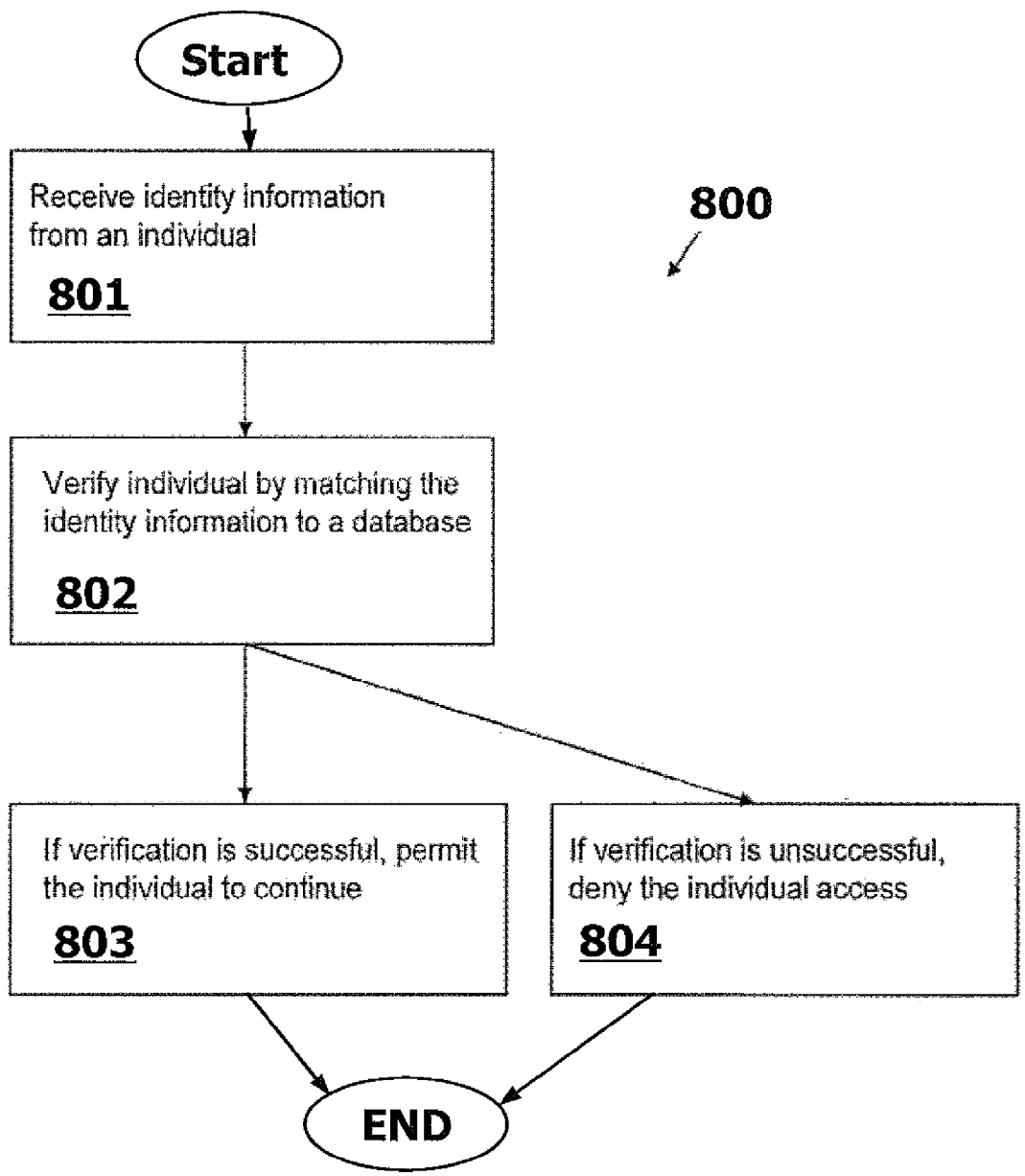
FIGS. 7-10 are schematic diagrams that illustrate methods and system for identity verification in a detention environment.

FIG. 7 is a diagram illustrating one embodiment of a method (800) according to aspects of the present disclosure. The method (800) is designed for use within a detention environment or as part of a method monitoring a detention environment. This method (800) applies to anyone who attempts to interact with an individual subject to a detention environment, for example, by visiting and/or making a transaction on behalf of the individual subject to the detention environment. As used herein, the term "individual" is used to refer to a person attempting to interact with, or on behalf of, a person subject to the detention environment who will be referred to herein as the "individual subject to the detention environment." The method (800) receives the individual's identity information at step (801) by way of a programmable device and/or system, such as e.g., a computer, a call screening system, a detention environment guard, and/or an interactive audio/video system and device for use in a detention environment disclosed in U.S. patent application Ser. No. 13/088,883, published as U.S. Patent Application Publication No. US 2012-0262271 A1 and incorporated by reference herein. It should be appreciated that where a definition or use of a term in an incorporated application or reference is inconsistent with or contrary to the definition of that term provided herein, the definition of that term provided herein applies. The individual could be prompted to input identity information, such as, the zip code of their residence, mother's maiden name, a number of digits of the applicant's social security number, or other questions that lead to a unique individual. Identity information may also be contained in an identification card, which is processed by the programmed device or system, and may assist with the verification process. As just one example, an individual may scan their driver's license, and the programmed device or system may read the license, and fill out form fields such as name, address, and gender based on information on the license. This process may be implemented by use of a magnetic strip, a two-dimensional or three-dimensional bar code, and/or optical character recognition. Identity information may also be biometric information, such as, facial recognition, body recognition, voice recognition, retinal scan, fingerprint, DNA sample, and/or palm print. Identity information may also come from an interaction with the individual's phone, such as, swiping a phone through a scanner, keying in a unique phrase or number that was sent to a phone, or answering a call made to the individual's phone.

The method (800) is also designed to verify an individual's identity by matching the individual's identity information with information in a database (at step 802). The database is populated with identity information from a data source or a plurality of data sources. In some cases the identity information from the data source existed prior to the individual's interaction with the individual subject to the detention environment. These data sources may include: line information databases to find phone number and address associations; best known name and address databases to associate names with addresses; identification verification databases to match a provided name with digits of a social security number or other unique participant-assigned number; national financial information databases for existing financial records; national passport database; other government issued identification database such as a drivers' license database, a military identification database, or state issued identification card database; open warrants database; a national victim notification network such as VINE or VINELink; or a "do not contact" database. The database may also be populated by the data sources upon command, at intervals, or dynamically.

The method (800) is also desirably compatible with a data source such as the consolidated voicemail platform disclosed in U.S. patent application Ser. No. 12/826,168, published as U.S. Patent Application Publication No. US 2011-0317685 A1 and incorporated by reference herein, and an information exchange facilitating system such as e.g., the secure social network disclosed in U.S. patent application Ser. No. 13/438,940, published as U.S. Patent Application Publication No. US 2013-0268589 A1 and is also incorporated by reference herein.

In some circumstances, an investigator will review attempted interactions with individuals subject to the detention environment. As just one example, an individual will attempt to interact by depositing money in the commissary account of an individual subject to the detention environment. The method (800) will check the database, and ask the individual enough questions until the method (800) is able to positively match the individual's identity information with information in the database. A consequence of this method (800) is that individuals will be verified upon each attempted interaction. For example, there may be several variations of J. Jones, J. D. Jones, Jonathan Jones, and John Jones appearing in a criminal investigation that involves attempted interactions with an individual subject to a detention environment.

The identification of a J. Jones in a metropolitan area may require an extraordinary effort. Since the disclosed method (800) requires verification of an individual before he/she is allowed to interact with an individual subject to the detention environment, the disclosed method (800) may pinpoint the identity to a distinct individual named Jonathan D. Jones.

In an additional embodiment, the step of receiving identity information may also include receiving additional information from the individual after the individual is verified, such as e.g., a photograph or digital image of the individual, a scan of the individual's identification card, and additional information from additional questions. After the individual is verified, the individual may also establish a username and password, or a unique personal identification phrase, number, or series of characters. This establishment of a username and password would facilitate an additional identification process during future attempted interactions.

In another embodiment, the disclosed method supplements a verified identity with additional information from the database such as e.g., a date of birth, an address, and/or a photograph. In yet another embodiment, information, such as a phone number, associated with the individual is found to be associated with previous phone calls made by the individual subject to the detention environment. In this case, the disclosed method may associate those previous phone calls with the verified identity information, allowing the method to retroactively link a person in a detention environment to a specific verified person through a phone number. Similar associations could be made through credit card data, address data, and more.

In another embodiment, when an individual had been previously verified, the method (800) may receive a previously verified individual's username and password as the identity information during the verification process (i.e., step 801). The method (800) may also receive a previously verified individual's physical attributes as the identity information during the verification process. The physical attributes may include a voiceprint comparison, facial and/or body recognition, DNA sample, retinal scan, and/or other form of biometric attribute. The method (800) may also receive a previously verified individual's identification credential as the identity information during the verification process; this may include a passport, driver's license, military identification, or similar. The method (800) may also receive during the verification process a previously verified individual's mobile phone interaction as the identity information, which may involve responding to a phone call and/or text message, and/or requiring the previously verified individual to call and/or text message to a specific phone number. In the absence of all other means of identification, and/or as a means to expedite the process, the method (800) may receive a detention environment staff member's authorization to authenticate a verified individual by sight, and/or through spoken and/or direct questions.

After step (802) is complete, the method (800) will either verify and/or not verify an individual's identity. The method (800) will either permit the individual to continue if the individual is verified at step 803, and/or deny the individual access if the individual is not verified at step 804. If the individual is not permitted to continue, then the method may proceed to the additional steps shown in FIG. 8. If the individual is permitted to continue, then the method may proceed to the additional steps shown in FIG. 9.

Figure 8:
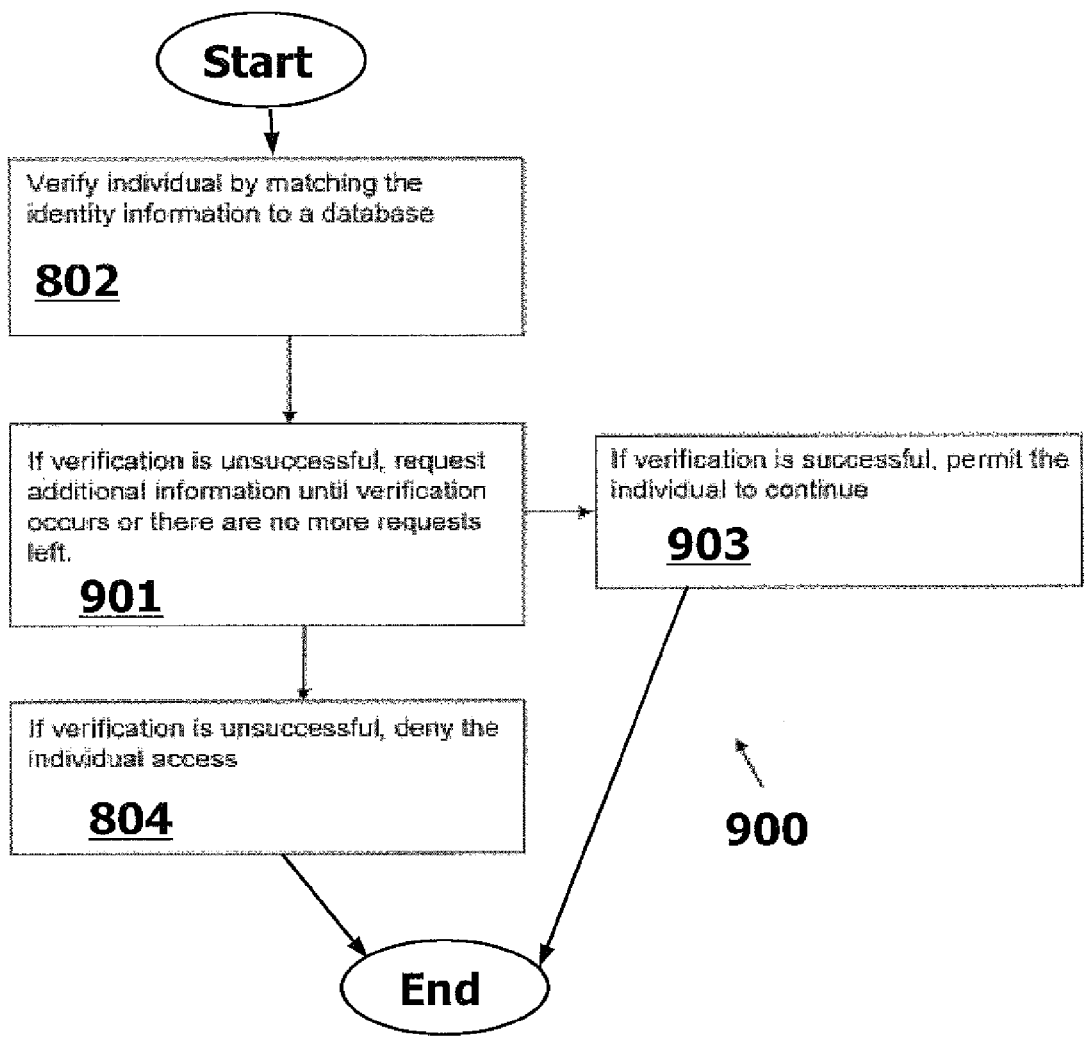

FIG. 8 illustrates an additional method designed for use when method (800) receives an individual's identity information, but fails to verify the individual. In that circumstance, method (900) will request additional identity information from the individual until a match is found and/or there are no more requests left to issue (step 901). The method (900) may request as many types of identity information from an individual as there are in the database. If verification is successful, the method (900) permits the individual to interact with the detention environment at step 903. If the verification is still unsuccessful, then the method (900) denies the individual interaction with the individual subject to the detention environment (step 804).

Figure 9:
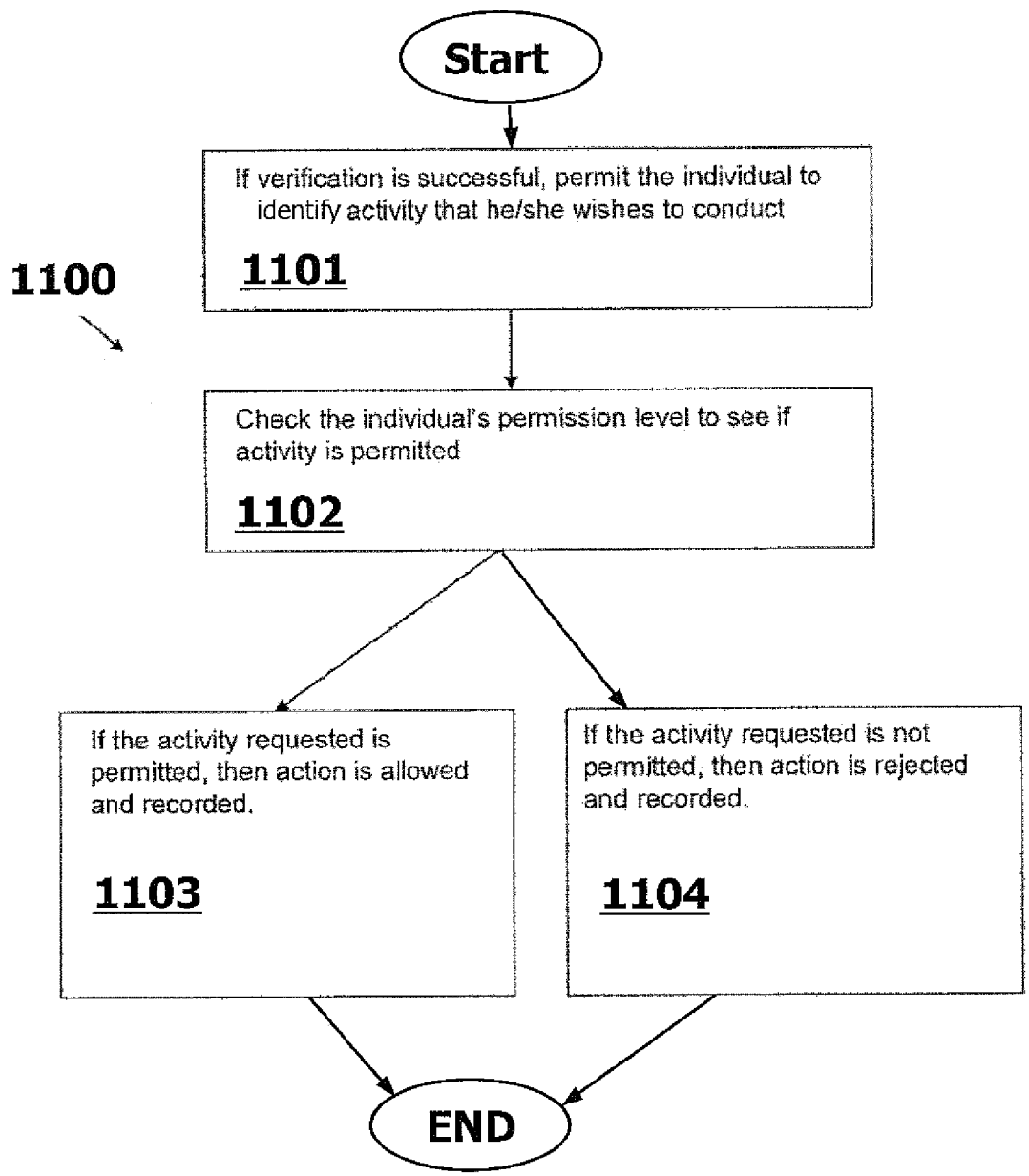

FIG. 9 illustrates an additional method (1100) designed to check an individual's permission level to determine whether a requested interaction is allowed. Once verification is successful, the method (1100) permits the individual to request a particular interaction to conduct at step 1101 (e.g., placing a telephone call). The method (1100) then checks the verified individual's permission level to see if the requested activity is permitted (step 1102). If the interaction requested is permitted, the method (1100) permits the interaction and records the interaction at step 1103. If the activity requested is not permitted, then the interaction is rejected and the attempt is recorded at step 1104.

Figure 10:
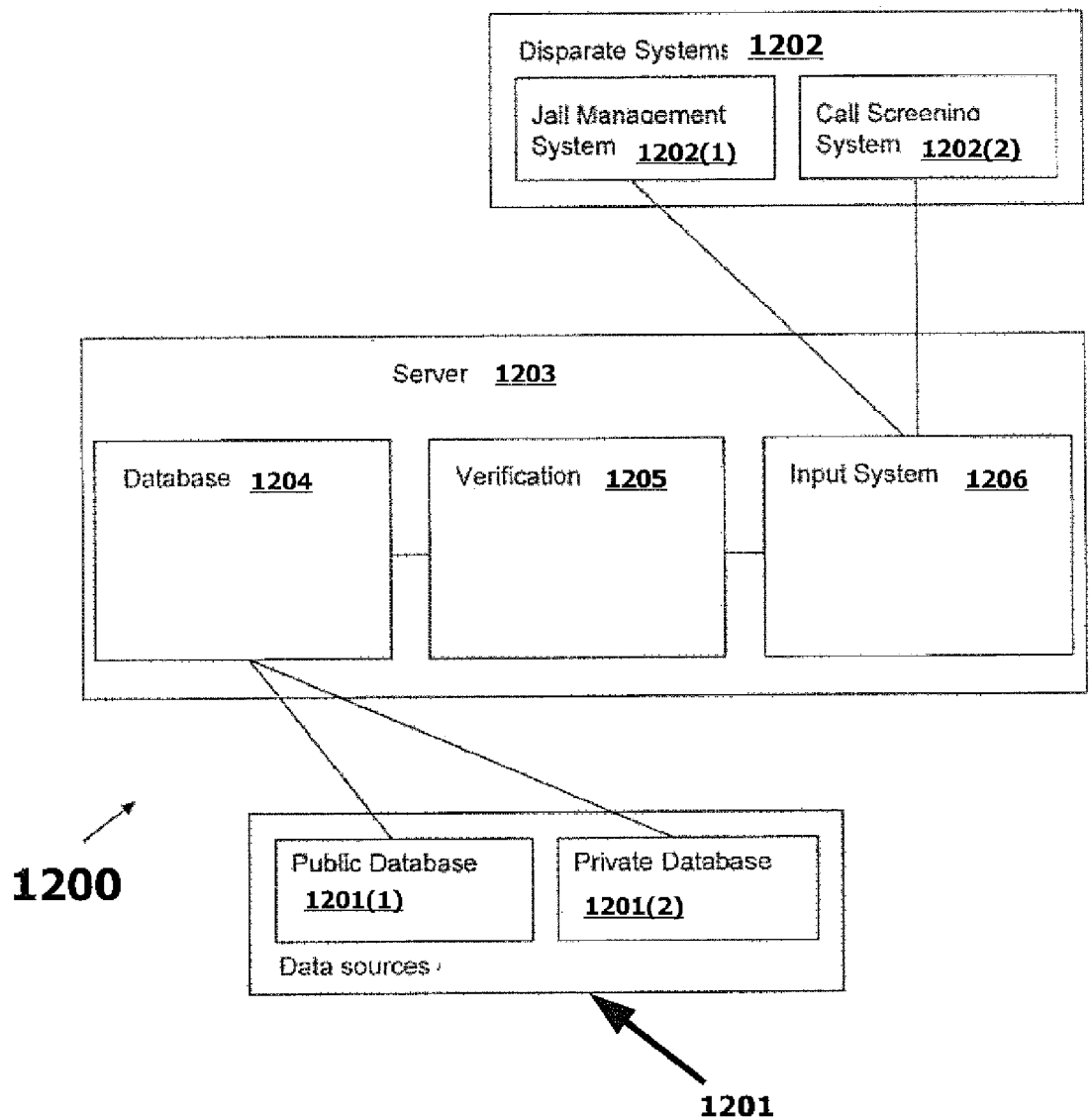

FIG. 10 is a diagram illustrating one embodiment of a system (1200) according to aspects of the present disclosure. The system (1200) includes a server (1203) comprising a database (1204), a verification system (1205), and an input system (1206). The server (1203) is programmed to perform one, all, or a combination of the methods (800), (900), (1100) disclosed herein. The database (1204) is populated with identity information from various data sources (1201), such as, a public database (1201(1)) and/or a private database (1201(2)). Public databases (1201(1)) may include a line information database, best known name and address database, social security database, national financial information database, national passport database, government issued identification database, warrants database, national victim network database, and/or "do not contact" database. Private databases (1201(2)) may include databases aggregated by the detention environment itself. In some cases the identity information from the data source (1201) existed prior to the individual's interaction with the individual subject to the detention environment. The database (1204) may also be populated by the data sources upon command, at intervals, and/or dynamically.

The system (1200) is preferably compatible with data sources (1201), such as e.g., the interactive audio/video system and device for use in a detention environment disclosed in U.S. patent application Ser. No. 13/088,883, published as U.S. Patent Application Publication No. US 2012-0262271 A1, the consolidated voicemail platform disclosed in U.S. patent application Ser. No. 12/826,168, published as U.S. Patent Application Publication No. US 2011-0317685 A1, an information exchange facilitating system such as e.g., the secure social network disclosed in U.S. patent application Ser. No. 13/438,940, published as U.S. Patent Application Publication No. US 2013-0268589 A1.

When an individual inputs information through one of the disparate systems (1202) for managing detention environment interactions, such as a jail management system (1202(1)) and/or call screening system (1202(2)), the server (1203) receives that information through its input system (1206). The verification system (1205) takes the information obtained through the input system (1206) and verifies the identifying information by matching it with the information stored in the database (1204).

In accordance with the practices of persons skilled in the art of computer programming, embodiments of the method (800), (900), (1100) are described with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, and/or organic properties corresponding to the data bits. Embodiments may also encompass integrated circuitry including circuit elements capable of performing specific system operations.

When implemented in a programmed device and/or system, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory and/or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed.

Now that some related environmental situations and systems have been described, the claimed embodiments and example methods for implementing a time-based multi-variant alarm system will now be further described.

One or more embodiments include triggering and display or notification of alarms in a detention environment based on multiple communication or deposit events.

Embodiments may include a multivariable alarm feature, which allows facility staff and administrators with to create, or edit, and save alarms. An alarm, in one or more embodiments of the may include configuring filtering rules to determine what constitutes an alarm, determining who is notified and determining how the alarm notifies each staff member, which may include different notification methods (automated call, text, voicemail) at different times of day and days of the week.

Various embodiments may also include:
Alarm Configuration: The person configuring the alarm may create a new alarm by selecting some of the following types of example options, perhaps selected more than once.
Who is Being Watched
Types of People: a search may focus on friends & family members of a detainee(s), detainee(s) or perhaps both.
What Facilities: The person configuring the alarm may select from the facilities that are available to him.
Specific Person or Group of: In case the searching person knows part of a name, or an entire name, of the person or people they are searching for.
SSN: Social security number or part of the social security number, if known.
Date of Birth: A range or a specific day.
Gender: Male, female, other or combinations.
Last booked date: a date, date range or none specified.
Time Rules
Time of day constraints, such as limiting an alarm to events that fall between 9 p.m. and 6 a.m.

Deposit Rules
Day of week constraints, such as limiting an alarm to specific days of the week.
Number of depositors, which allows an alarm to be triggered if a specified number of depositors is reached for a person or group.
Number of deposits, which allows an alarm to be triggered if a specified number of deposits are made to and/or by a person or group.
Number of cash deposits, which allows an alarm to be triggered if a specified number of cash deposits, are made to and/or by a person or group. Cash deposits are sometimes more likely to be associated with criminal activity.
Number of credit card deposits, which allows an alarm to be triggered if a specified number of credit card deposits, are made to and/or by a person or group. Credit card deposits are perhaps more likely to be associated with criminal activity when associated with a detainee who has been charged and/or convicted of identity theft and/or fraud.
Dollars deposited, which allows an alarm to be triggered when a threshold of funds (including credit card, cash, MoneyGram and more) have been deposited into a specified individuals account.
Cash deposited, which allows an alarm to be triggered when a threshold of cash has been deposited into a specified individuals account. Cash deposits are more likely to be associated with criminal activity.
Cash deposited by a single source, which allows an alarm to be triggered when a threshold of cash has been deposited into a specified individual's account by a single person. Large cash deposits from a single person are more likely to be associated with criminal activity.
Credit card funds deposited, which allows an alarm to be triggered when a threshold of funds from a credit card have been deposited into a specified individual account. Credit card deposits are perhaps more likely to be associated with criminal activity when associated with a detainee who has been charged and/or convicted of identity theft and/or fraud.
Number of completed calls, which triggers an alarm when a threshold of completed phone calls have been met.
Number of attempted calls, which allows an alarm to be tied to a set threshold of calls attempted but not completed.
Number of call minutes, which allows an alarm to be tied to the total number of minutes that a detainee and/or friend and family member spends on connected phone calls.
Number of voicemails, which allows for an alarm to be tied to the total number of voicemail that an individual receives.
Number of messages sent, which allows for an alarm to be tied to the total number of messages sent by the person or group specified.
Number of messages received, which allows for an alarm to be tied to the total number of messages received by the person or group specified.
Number of photos shared, which allows for an alarm to be tied to the total number of photos shared by the person or group specified.
Number of photos available, which allows for an alarm to be tied to the total number of photos available to be seen by the person or group specified.
Number of contacts, which allows for an alarm to be tied to the total number of people that an individual or group of individuals has in their contact list.

Number of minutes spent Web browsing, which allows for an alarm to be tied to the total minutes that a person or group spends browsing available Internet sites via an inmate visitation station.

Number of grievances/requests filed, which allows for an alarm to be tied to the total number of inmate requests filed by an inmate or group of inmates. An inmate request is typically a digital form that is filled out and submitted to a facility staff member, such as a complaint about food, and/or a crime tip.

Number of games played, which allows for an alarm to be tied to the total number of educational games played by the person or group specified. In some implementations, games are available to detainees via a video vitiation environment, tablet or other device suitable for video visitation.

Number of video visits, which allows for an alarm to be tied to the total number of video visits engaged in by the person or group specified.

Number of video visit minutes, which allows for an alarm to be tied to the total number of minutes of video visiting engaged in by the person or group specified.

Who gets notified when an alarm event occurs? One or more embodiments of the invention allow the alarm to be sent to any number of people with access to the information in the alarm.

Define time periods for alarm notification windows that have different methods of desired notifications, such as 9-5 on weekdays for one type of notification and all other times for a secondary form of alarm notification.

Define notification methods for each specified time period. For each time period that has been specified, an alarm notification may be, but not limited to:

Text message delivered via short messaging service (SMS) or multimedia messaging service (MMS) notification to a mobile device, for example.

Email—an alarm notification email sent to one or more notification recipients.

Onscreen alert such as a color, highlighted text, and/or moving an event to the top of a list.

Automated call, which involves a phone call with a computer-generated voice announcing alarm details to a designated alarm recipient.

Computer desktop alert, such as Growl, Snarl and/or other on-screen display notification mechanisms.

A system event, appropriate for notifying third party software systems of an alarm event.

Table I further summarizes example categories, options and attributes for setting up alarms:

TABLE I

| Category | Options | Attribute Properties |
| --- | --- | --- |
| Person type | detainee<br>friends & family<br>detainee and friends & family | Only one option may be selected |
| Facilities | facility A<br>facility B<br>facility C | Any combination may be selected |
| Name | first name<br>last name | Full or partial names may be specified |
| Social Security Number ("SSN") | up to 9 digits | full or partial SSN |
| Date of birth | specific date<br>date range | Only one option may be utilized |
| Gender | male<br>female | Either or both may be selected |

TABLE I-continued

| Category | Options | Attribute Properties |
| --- | --- | --- |
| Last booking date | specific date<br>date range | Only one option may be utilized |

Figure 11:
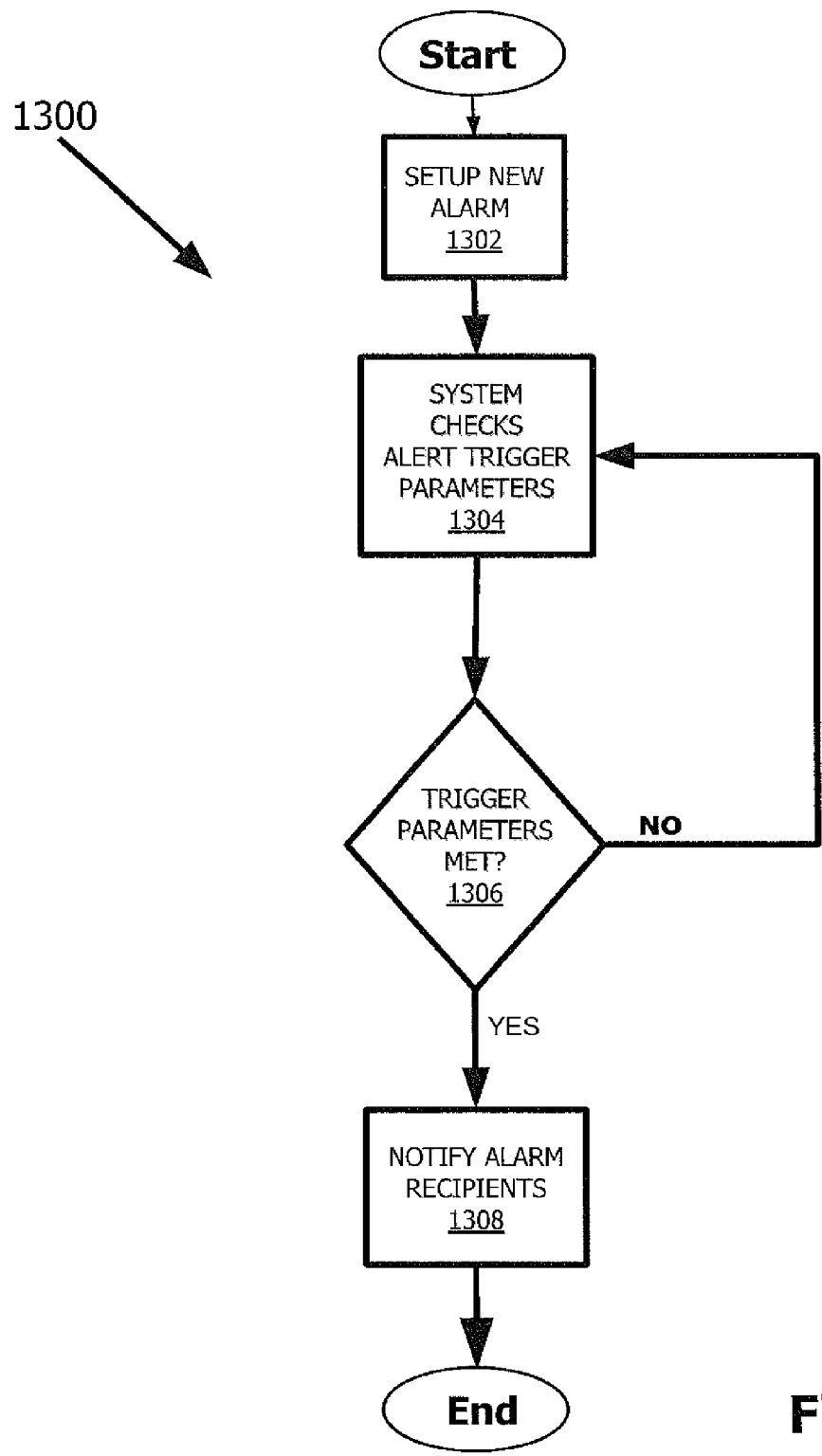
FIGS. 11-14 are flowchart diagrams that illustrate an example method for implementing a time-based multivariable alarm system.

Now referring to FIG. 11, an example method for using and setting up a time-based multivariable alarm will be described. The various operations of FIGS. 11-14 may be carried out, for example, by a processor of administrator computing device (206) of FIG. 2, responsive to user input.

Method (1300) is a very high-level description of an alarm implementation and how it may be ran. At an operation, a new alarm is setup (1302) and the related system checks/monitors for alert trigger parameters (1304). If trigger parameters are met (1306), specified alarm notification recipients are notified (1308).

Figure 12:
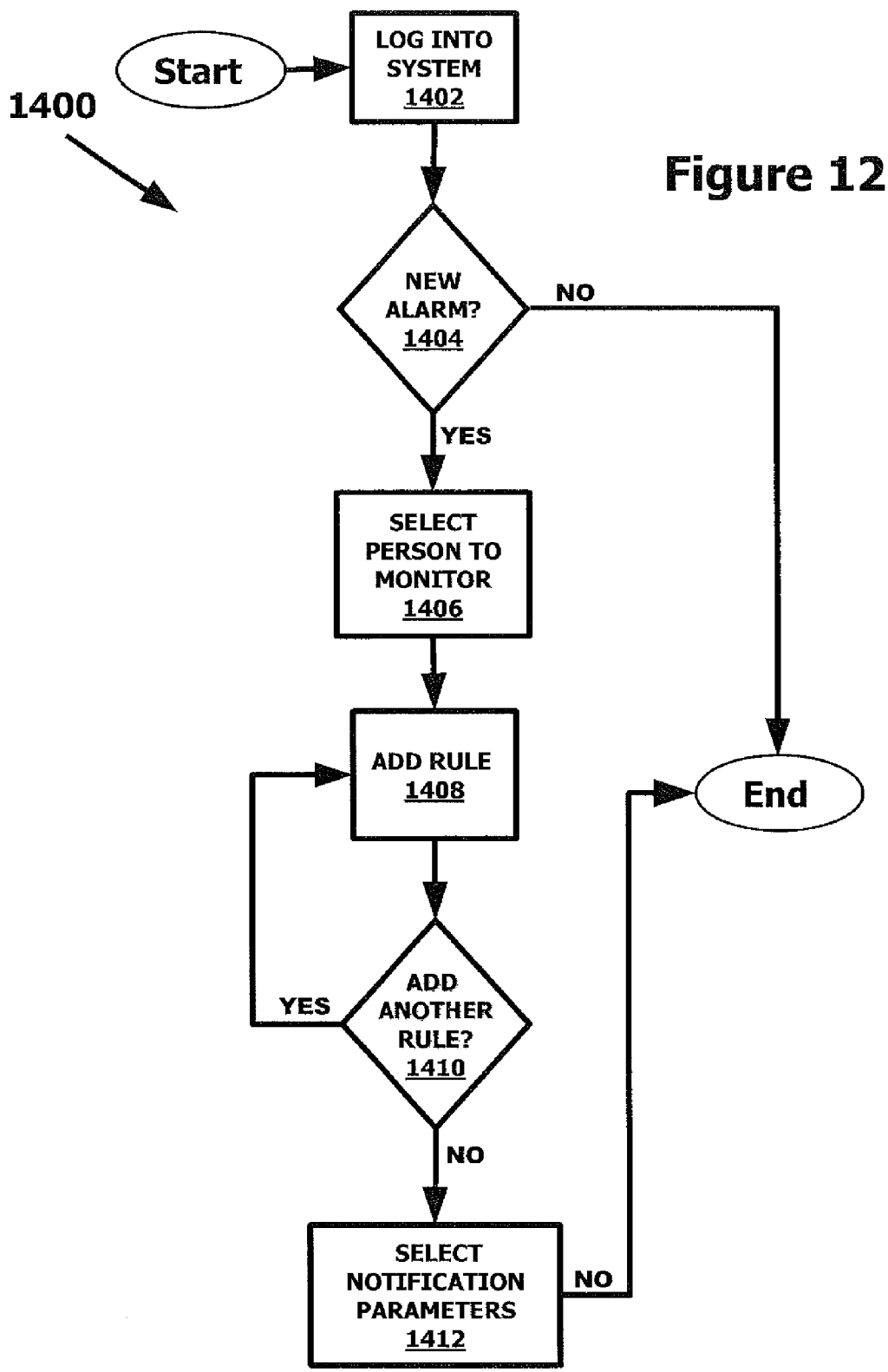
Figure 13:
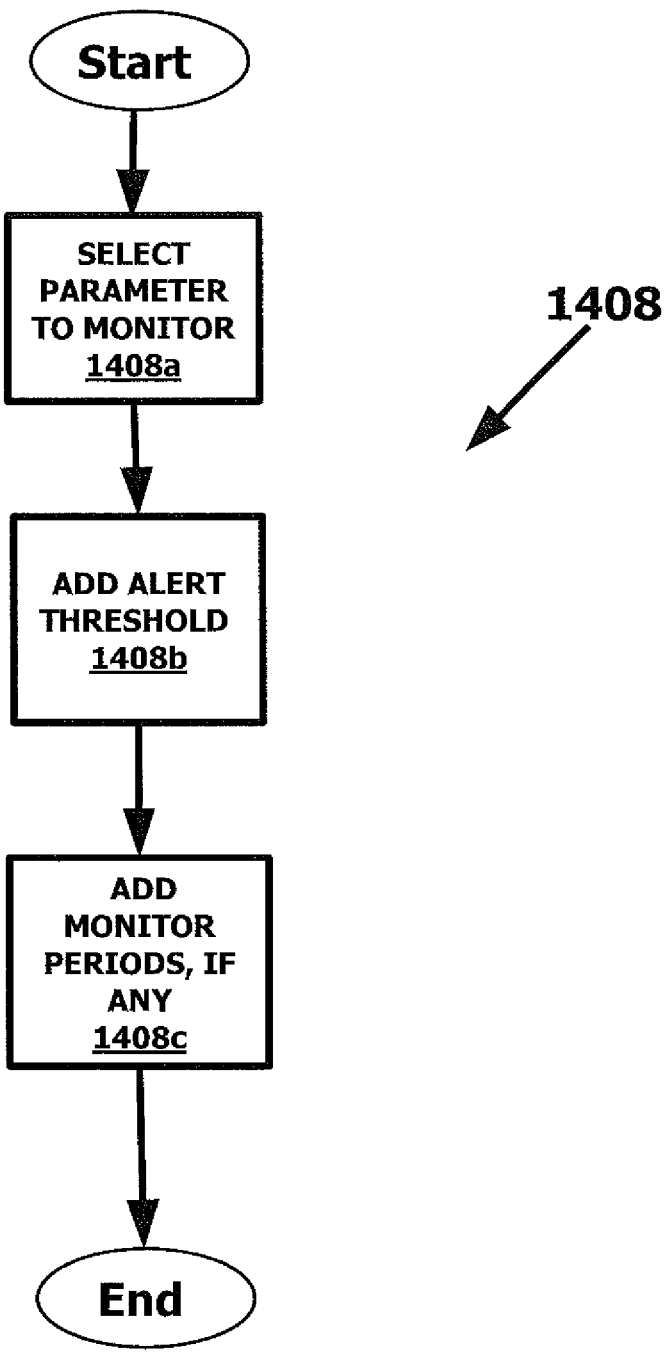
Figure 14:
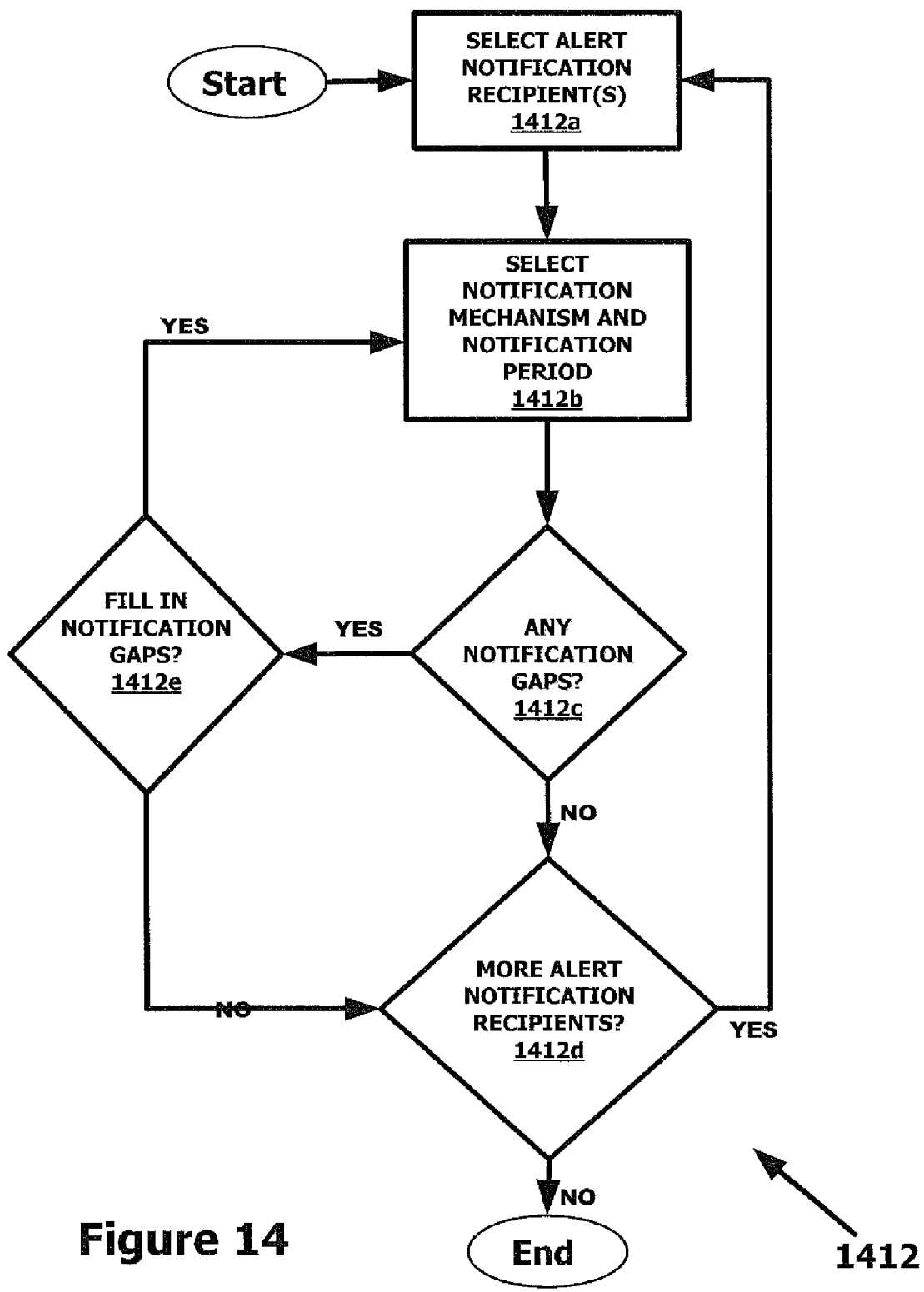

Method (1400), of FIGS. 12-14, illustrates setup of a new alarm. Typically, an end user logs into a system (1402) and elects to do a new alarm (1404). A person and/or detainee for monitoring is selected (1406), one or more rules are added (1408, 1410) and notification parameters are selected at operation (1412).

Add rule operation (1408) is further detailed via FIG. 13 such that a parameter is selected for monitoring (1408a), alert threshold is selected (1408b) and time monitor periods are added as desired (1408c).

Select notification parameters operation (1412) is further detailed in FIG. 14 and includes selecting notification recipients (1412a) and notification mechanism (and related notification period), via operation (1412b). If there are times during the day that were not specified to notify a person (1412c), the gaps may be filled in (1412e). Operation (1412) further includes operation for adding additional notification recipients as desired (1412d).

While a number of exemplary aspects and embodiments have been discussed above, those of skill in the art will recognize certain modifications, permutations, additions and sub-combinations thereof. It is therefore intended that the following appended claims, and claims hereafter introduced, are interpreted to include all such modifications, permutations, additions and sub-combinations as are within their true spirit and scope.

What is claimed is:

1. A computer implemented method for generating a time-based multivariable secure facility alarm comprising:
    selecting a first person for alert monitoring;
    selecting alert monitor criteria pertaining to the first person;
    selecting a plurality of alarm notification rules;
    detecting an occurrence of a financial transaction event with the first person that satisfies the alert monitor criteria;
    obtaining a second person identifier for a second person that is party to the financial transaction event;
    detecting an occurrence of a second event between the first person and the second person, the second event being performed using a disparate system than the financial transaction event, the occurrence of the second event satisfying the alert monitor criteria based on being between the first person and the second person; and
    generating an alarm notification, based upon the plurality of alarm notification rules, according to the occurrence of the financial transaction event and the occurrence of the second event being detected, wherein the alert monitor criteria includes at least two events and a time period such that the alert monitor criteria is satisfied when the at least two events occur within the time period, the at least two events comprising the financial transaction event and the second event, and wherein at least one event of the at least two events is a non-telephonic event.

2. The computer-implemented method as recited in claim 1, wherein an at least one other event of the at least two events is a video visit.

3. The computer-implemented method as recited in claim 2, wherein the at least two events comprises at least three events, and wherein a third event of the at least two events is a telephonic event.

4. The computer-implemented method as recited in claim 1, wherein the financial transaction comprises a threshold currency amount and a currency source-type.

5. The computer-implemented method as recited in claim 1, wherein at least one event of the at least two events is a video visit.

6. The computer-implemented method as recited in claim 1, wherein the at least two events are non-telephonic events.

7. The computer-implemented method as recited in claim 1, wherein the alarm notification rules comprises whom to notify and a notification method, wherein the notification method is based on when the occurrence of the second event is detected during pre-defined periods of a week.

8. The computer-implemented method as recited in claim 1, wherein the alarm notification is based on when the occurrence of the second event is detected during a plurality of pre-defined calendar dates.

9. The computer-implemented method as recited in claim 7, wherein at least two differing notification methods are utilized, and wherein each of the at least two different notification methods corresponding to non-overlapping pre-defined periods of the week.

10. A non-transitory computer-readable medium, for generating a time-based multivariable secure facility alarm, comprising executable instructions operative to cause one or more processors to:
   select a first person for alert monitoring;
   select alert monitor criteria pertaining to the first person;
   select a plurality of alarm notification rules;
   detect an occurrence of a financial transaction event with the first person that satisfies the alert monitor criteria;
   obtain a second person identifier for a second person that is party to the financial transaction event;
   detect an occurrence of a second event between the first person and the second person, the second event being performed using a disparate system than the financial transaction event, the occurrence of the second event satisfying the alert monitor criteria based on being between the first person and the second person; and
   generate an alarm notification, based upon the plurality of alarm notification rules, according to the occurrence of the financial transaction event and the occurrence of the second event being detected,
   wherein the alert monitor criteria includes at least two events and a time period such that the alert monitor criteria is satisfied when the at least two events occur within the time period, the at least two events comprising the financial transaction event and the second event, and
   wherein at least one event of the at least two events is a non-telephonic event.

11. The computer-readable medium as recited in claim 10, wherein an at least one other event of the at least two events is a video visit.

12. The computer-readable medium as recited in claim 11, wherein the at least two events comprises at least three events, and wherein a third event of the at least two events is a telephonic event.

13. The computer-readable medium as recited in claim 10, wherein the financial transaction comprises a threshold currency amount and a currency source-type.

14. The computer-readable medium as recited in claim 10, wherein at least one event of the at least two events is a video visit.

15. The computer-readable medium as recited in claim 10, wherein the at least two events are non-telephonic events.

16. The computer-readable medium as recited in claim 10, wherein the alarm notification rules comprises whom to notify and a notification method, wherein the notification method is based on when the occurrence of the second event is detected during pre-defined periods of a week.

17. The computer-readable medium as recited in claim 10, wherein the alarm notification is based on when the occurrence of the second event is detected during a plurality of pre-defined calendar dates.

18. The computer-readable medium as recited in claim 16, wherein at least two differing notification methods are utilized, and wherein each of the at least two different notifications methods corresponding to non-overlapping pre-defined periods of the week.

19. An apparatus for generating a time-based multivariable secure facility alarm, the apparatus comprising:
   at least one processor;
   at least one network interface;
   a memory;
   a software application, physically stored in the memory, comprising instructions operable to cause the at least one processor and the apparatus to:
   select a first person for alert monitoring;
   select alert monitor criteria pertaining to the first person;
   select a plurality of alarm notification rules;
   detect an occurrence of a financial transaction event with the first person that satisfies the alert monitor criteria;
   obtain a second person identifier for a second person that is party to the financial transaction event:
   detect an occurrence of a second event between the first person and the second person, the second event being performed using a disparate system than the financial transaction event, the occurrence of the second event satisfying the alert monitor criteria based on being between the first person and the second person; and
   generate an alarm notification, based upon the plurality of alarm notification rules, according to the occurrence of the financial transaction event and the occurrence of the second event being detected,
   wherein the alert monitor criteria includes at least two events and a time period such that the alert monitor criteria is satisfied when the at least two events occur within the time period, the at least two events comprising the financial transaction event and the second event, and
   wherein at least one event of the at least two events is a non-telephonic event.

20. The apparatus as recited in claim 19, wherein an at least one other event of the at least two events is a video visit.

21. The apparatus as recited in claim 20, wherein the at least two events comprises at least three events, and wherein a third event of the at least two events is a telephonic event.

22. The apparatus as recited in claim 19, wherein the financial transaction comprises a threshold currency amount and a currency source-type.

23. The apparatus as recited in claim 19, wherein at least one event of the at least two events is a video visit.

24. The apparatus as recited in claim 19, wherein the at least two events are non-telephonic events.

25. The apparatus as recited in claim 19, wherein the alarm notification rules comprises whom to notify and a notification method, and wherein the notification method is based on when the occurrence of the second event is detected during pre-defined periods of a week.

26. The apparatus as recited in claim 19, wherein the alarm notification method is based on when the occurrence of the second event is detected during a plurality of pre-defined calendar dates.

27. The apparatus as recited in claim 25, wherein at least two differing notification methods are utilized, and wherein each of the at least two different notification methods corresponding to non-overlapping pre-defined periods of the week.

* * * * *